United States Patent
Kuwako et al.

(10) Patent No.: US 6,792,558 B2
(45) Date of Patent: Sep. 14, 2004

(54) BACKUP SYSTEM FOR OPERATION SYSTEM IN COMMUNICATIONS SYSTEM

(75) Inventors: Kenichi Kuwako, Kawasaki (JP); Mitsunobu Yoshida, Kawasaki (JP); Hideki Dake, Kawasaki (JP); Eiichi Takada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 550 days.

(21) Appl. No.: 09/953,693

(22) Filed: Sep. 17, 2001

(65) Prior Publication Data

US 2002/0162044 A1 Oct. 31, 2002

(30) Foreign Application Priority Data

Apr. 27, 2001 (JP) ........................................ 2001-132510

(51) Int. Cl.[7] ............................................... G06F 11/00
(52) U.S. Cl. .......................................... 714/13; 714/47
(58) Field of Search ............................ 714/4, 9, 10, 13, 714/31, 47; 370/216

(56) References Cited

U.S. PATENT DOCUMENTS

| | | | | |
|---|---|---|---|---|
| 4,710,926 A | * | 12/1987 | Brown et al. | 714/4 |
| 5,260,945 A | * | 11/1993 | Rodeheffer | 714/4 |
| 5,515,501 A | * | 5/1996 | LaBerge et al. | 714/10 |
| 5,923,840 A | * | 7/1999 | Desnoyers et al. | 714/48 |
| 6,370,656 B1 | * | 4/2002 | Olarig et al. | 714/23 |
| 6,442,713 B1 | * | 8/2002 | Block et al. | 714/43 |
| 6,535,998 B1 | * | 3/2003 | Cabrera et al. | 714/15 |

* cited by examiner

Primary Examiner—Robert Beausoliel
Assistant Examiner—Gabriel L. Chu
(74) Attorney, Agent, or Firm—Katten Muchin; Zavis Rosenman

(57) ABSTRACT

When a network element (NE) detects a trouble in an operation system (OpS) for operating the NE itself, a representative NE is determined among a plurality of NEs operated by this OpS. The representative NE selects a substitute OpS from other OpSs and transmits a request for operating the plurality of NEs to the substitute OpS. Thereafter, the plurality of NEs come under the operation of the substitute OpS. The substitute OpS operates the plurality of NEs based on the operation request.

26 Claims, 17 Drawing Sheets

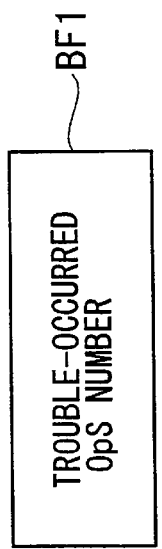
*FIG. 10A*
BROADCAST FRAME
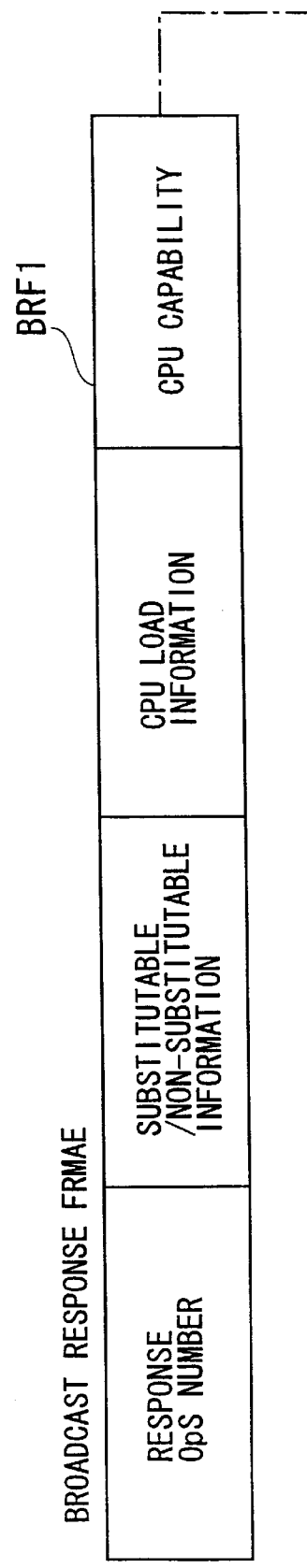
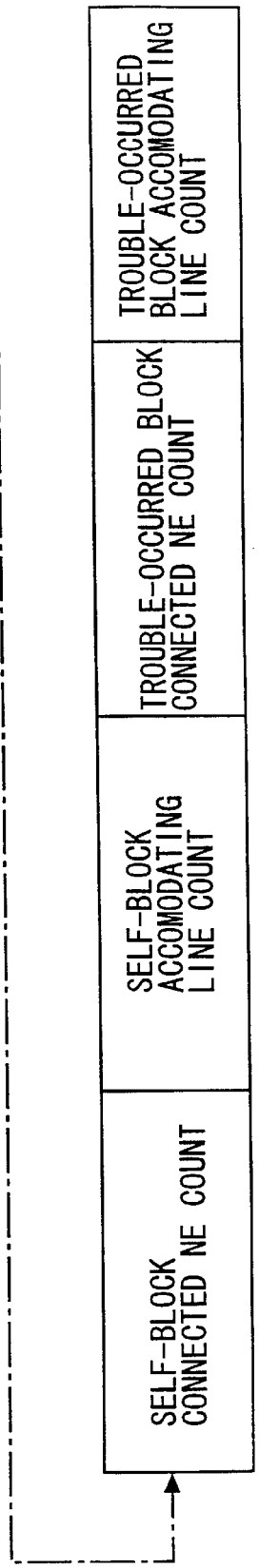
*FIG. 10B*
BROADCAST RESPONSE FRMAE

BROADCAST FRAME

BROADCAST RESPONSE FRMAE

BACKUP SYSTEM FOR OPERATION SYSTEM IN COMMUNICATIONS SYSTEM

BACKGROUND OF THE INVENTION

1. Field of the Invention

The present invention relates to a backup system for an operation system in a communications system in which network elements (NEs) and a plurality of operation systems (OpSs) for operating the NEs, are connected to each other via a network.

2. Description of the Related Art

There has hitherto been a communications system in which at least one NE and a plurality of OpSs for operating the NE are connected to each other via the network. In this communications system, the following methods are adopted for monitoring a normality of the OpS itself.

(1) A host OpS for monitoring the OpSs is installed in the communications system.

(2) The OpSs monitor each other.

The method (1) or (2) being adopted, if a trouble occurs in a certain OpS in the communications system, the host OpS or other OpS as a substitute for the OpS with the trouble occurred operates the NEs. The communications system is thereby operated with stability.

There arise the following problems inherent in the prior art. If the method (1) is adopted, the host OpS and other device must be installed in the communications system, and this configuration leads to a rise in operating cost for the communications system. Further, if the method (2) is adopted, a load on the OpS increases, with the result that a performance of the OpS declines.

SUMMARY OF THE INVENTION

It is a primary object of the present invention to provide a backup system for an operation system in a communications system including network elements (Network Elements) and a plurality of operation systems, which has no necessity of further providing a system for monitoring the operation systems and is capable of restraining a rise in load upon the operation system.

To accomplish the above object of the present invention, according to one aspect of the present invention, a backup system for an operation system in a communications system, comprising: a plurality of operation systems connected to each other via a network; and a plurality of network elements operated by the plurality of operation systems, wherein each of the operation systems operates at least one of the plurality of network elements, each of the network elements monitors the operation system that operates the network element itself and detects failures in this operation system, when the failures are detected, if the failures-detected operation system operates a plurality of network elements, a representative network element is determined among the plurality of network elements under the failures-detected operation system, the representative network element selects a substitute operation system among the other operation systems and transmits an operation request to the substitute operation system, and each of the operation systems, when receiving the operation request, as the substitute operation system, operates the plurality of network elements under the failures-detected operation system.

According to the present invention, in the communications system including the NEs and the plurality of operation systems, there is no necessity of further providing the system for monitoring the operation systems, and the rise of load on the OpS can be restrained.

BRIEF DESCRIPTION OF THE DRAWINGS

FIG. 10A is an explanatory diagram showing a broadcast frame;

FIG. 10B is an explanatory diagram showing an example of a broadcast response frame;

DESCRIPTION OF THE PREFERRED EMBODIMENTS

Embodiments of the present invention will hereinafter be described with reference to the accompanying drawings. An architecture of each embodiment is exemplification, and the present invention is not limited to the range of the architectures of the embodiments.

Figure 1:
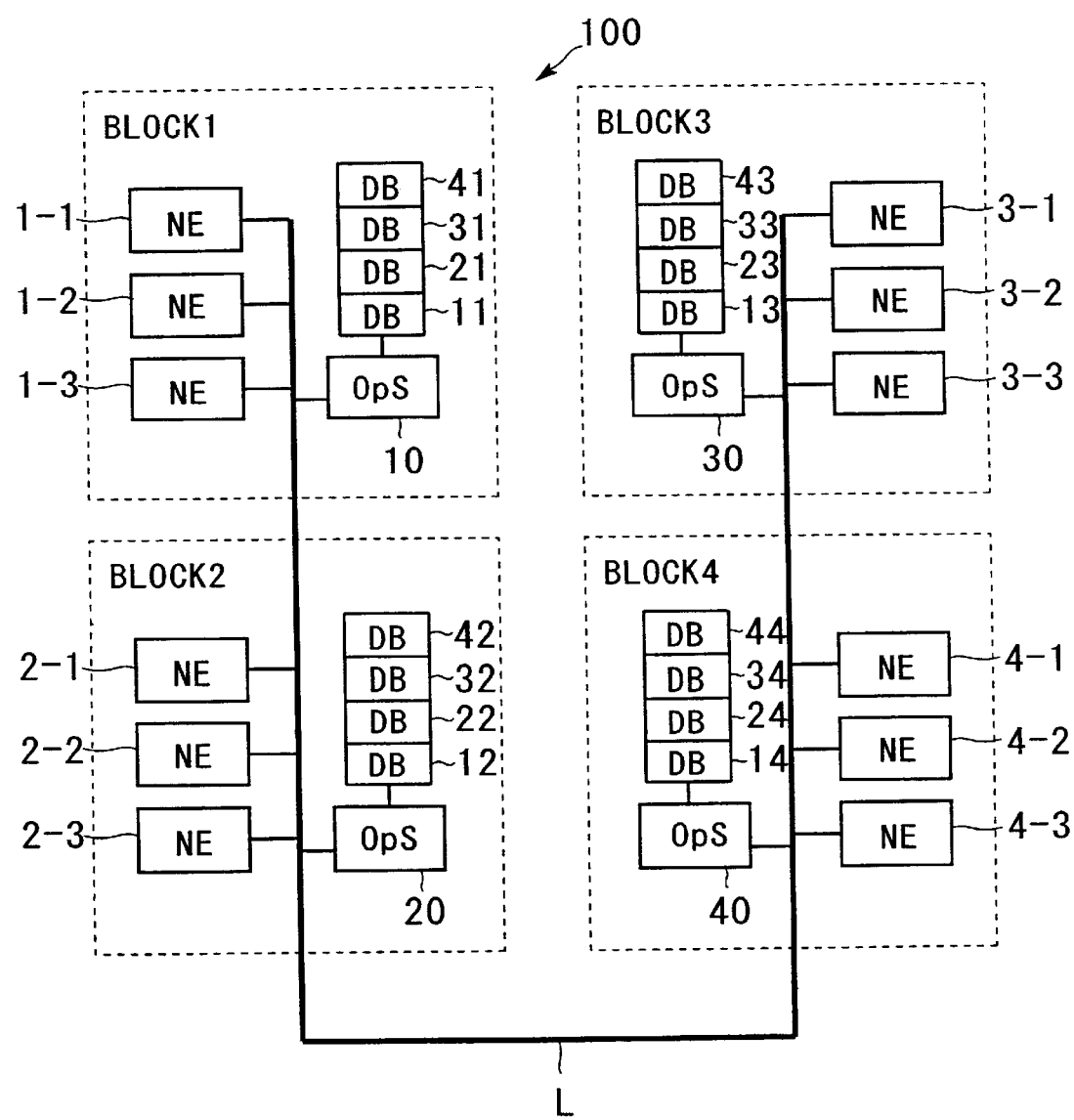
FIG. 1 is a diagram showing an example of system architecture of a communications system in an embodiment of the present invention.

FIG. 1 is a diagram showing a system architecture of a communications system 100 in the embodiment of the present invention. The communications system 100 is configured by physically connecting a plurality of network elements (NEs) (which are generally termed "communications devices") and a plurality of operation systems (OpSs) (which are generally termed "management or administration systems") via a communications line (network), wherein a plurality of blocks 1, 2, 3, 4 are logically segmented.

The blocks 1, 2, 3, 4 are defined as logical groups each consisting of the OpS and at least one network element NE under operation of this OpS. For instance, the block 1 includes a plurality (e.g., three pieces) of NEs 1-1. 1-2, 1-3 and an operation system OpS 10. The OpS 10 contains a plurality of databases (DBs) 11, 21, 31, 41. Each of the blocks 2, 3, 4 has the same configuration as the block 1, and the OpSs and NEs belonging to the blocks 1, 2, 3, 4 have the same configurations.

Each of the NEs 1-1, 1-2, 1-3 may be defined as a transmission device or a switch for executing a variety of communications-oriented processes. The variety of processes is, for example, line setting (line control, switch control), device setting, and trouble shooting of the NE itself and/or the line. Processors (a CPU, an MPU and so forth) incorporated into the NE executes programs, thereby actualizing these processes.

The OpS 10 is defined as an operation system implementing a communications function of operating (controlling and monitoring) the NEs 1-1, 1-2, 1-3. The OpS 10 includes a processor (a CPU) and a memory, and the CPU executes programs, thereby actualizing functions of operating (controlling and monitoring) the NEs. The database DB 11 retains (is stored with) pieces of information (control information) for controlling the NEs 1-1, 1-2, 1-3.

Figure 2:
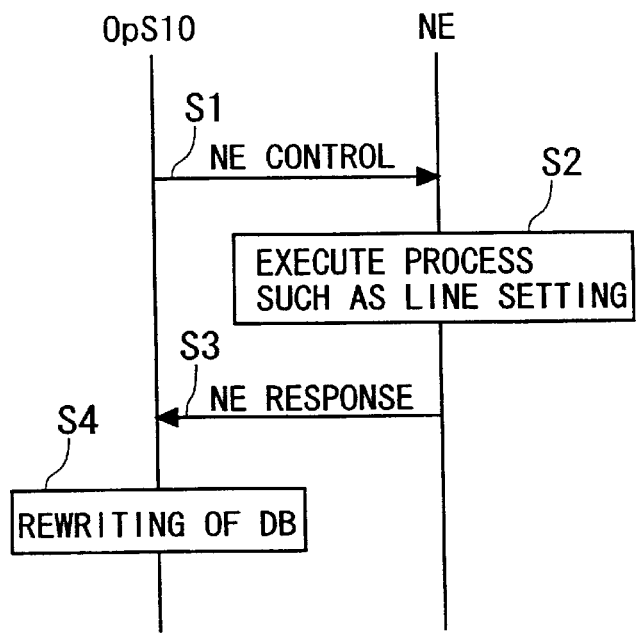
FIG. 2 is a sequence diagram showing how an OpS controls NEs.

FIG. 2 is a sequence diagram showing an operation when the OpS 10 controls a certain NE. Referring to FIG. 2, the OpS 10, when controlling a certain NE, reads the control information for controlling this NE from the DB 11, then generates a frame (a control frame) containing the readout control information, and transmits the generated frame to the above NE (step S1).

This NE, when receiving the control frame, executes a predetermined process based on the information contained in this control frame (step S2). The predetermined process is, for instance, line setting.

Thereafter, this NE generates a frame (a response frame) containing result information indicating processing/control results, and transmits this response frame to the OpS 10 (step S3).

The OpS 10, when receiving the response frame from the NE, updates the DB 11 on the basis of the result information contained in the response frame (step S4). With this processing, the DB 11 accumulates records of the processing/control results of the NEs 1-1, 1-2, 1-3.

Figure 3:
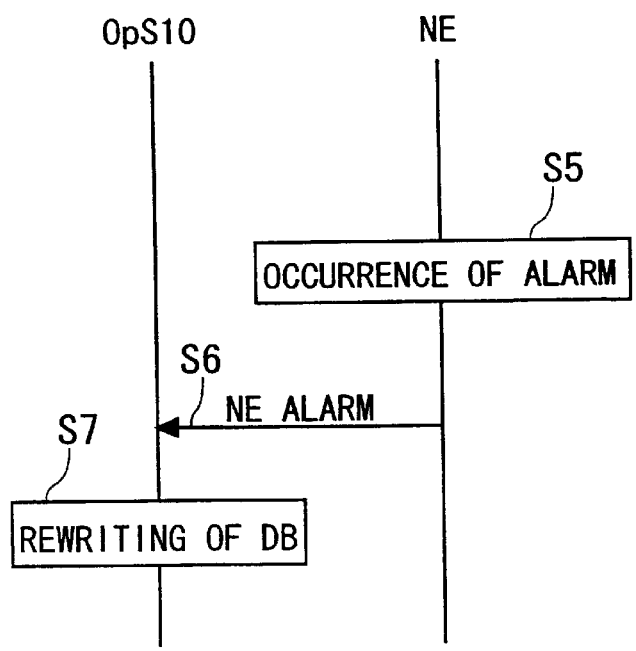
FIG. 3 is a sequence diagram showing how the OpS monitors the NEs.

Further, the OpS 10 collects pieces of alarm information from the NEs 1-1, 1-2, 1-3. FIG. 3 is a sequence diagram showing an operation when a certain NE troubleshoots (detects a trouble of) the NE itself.

Referring to FIG. 3, a certain NE, upon troubleshooting, gives an alarm (step S5). Next, this NE generates an alarm frame containing alarm information, and transmits the alarm frame to the OpS 10 (step S6).

The OpS 10, when receiving the alarm frame from the NE, updates the DB 11 based on the alarm information contained in the alarm frame (step S7). With this processing, the DB 11 accumulates records of the alarms (troubles or failures) occurred in the NEs 1-1, 1-2, 1-3.

Thus, the DB 11 accumulates, as information (first block information) on the operation of NEs of the block 1, the control information of the NEs 1-1, 1-2, 1-3, and information (obtained by the OpS's operating the operation target NEs of the OpS itself) based on the result information and the alarm information transmitted from the NEs 1-1, 1-2, 1-3.

Further, the OpS 10 receives information (second block information) on the operation of the NEs belonging to the block 2 via the communications line L from the OpS 20, and stores the DB 21 with the second block information. The DB 21 accumulates the second block information.

The second block information contains the control information used for the OpS 20 to control the NEs 2-1, 2-2, 2-3 within the block 2, and information (obtained by the OpS's operating the operation target NEs of the OpS itself) with which the OpS 20 stores the DB 22 on the basis of the result information and the alarm information received from the NEs 2-1, 2-2, 2-3.

Further, the OpS 10 receives information (third block information) on the operation of the NEs belonging to the block 3 via the communications line L from the OpS 30, and stores the DB 31 with the third block information. The DB 31 accumulates the third block information.

The third block information contains the control information used for the OpS 30 to control the NEs 3-1, 3-2, 3-3 within the block 3, and information (obtained by the OpS's operating the operation target NEs of the OpS itself) with which the OpS 30 stores the DB 33 on the basis of the result information and the alarm information received from the NEs 3-1, 3-2, 3-3.

Moreover, the OpS 10 receives fourth block information via the communications line L from the OpS 40, and stores the DB 41 with the fourth block information. The DB 41 accumulates the fourth block information.

The fourth block information is the control information used for the OpS 40 to control the NEs 4-1, 4-2, 4-3 within the block 4, and is information (obtained by the OpS's operating the operation target NEs of the OpS itself) with which the OpS 40 stores the DB 44 on the basis of the result information and the alarm information received from the NEs 4-1, 4-2, 4-3.

Accordingly, the DBs 11, 12, 13, 14 respectively accumulate the first block information. The DBs 21, 22, 23, 24 respectively accumulate the second block information. The DBs 31, 32, 33, 34 respectively accumulate the third block information. The DBs 41, 42, 43, 44 respectively accumulate the fourth block information. Thus, the OpSs 10, 20, 30, 40 have (incorporate) the plurality of databases corresponding respectively to the plurality of OpSs, and the plurality of databases accumulate the first through fourth block information corresponding to the OpSs 10, 20, 30, 40.

Each of the OpSs 10, 20, 30, 40, when updating the DB corresponding to the OpS itself, transfers a difference (difference information) occurring due to this updating to other OpSs. For instance, the OpS 10, if the DB 11 is updated as the DB corresponding to the OpS 10 itself, transfers a difference in contents accumulated in the DB that occurs due to this updating, to other OpSs 20, 30, 40.

Other OpSs 20, 30, 40 update the DBs corresponding thereto by use of the difference information received from the OpS 10. The contents accumulated in the plurality of DBs of the blocks 1, 2, 3, 4 are thereby synchronized.

Further, in each of the blocks 1, 2, 3, 4, the plurality of NEs periodically transmits a monitor frame (a monitor message) to the OpS installed in the same block, and receives a response frame (a response message) to the monitor frame from the OpS. With this operation, each NE monitors whether the OpS concerned functions normally (see FIG. 4).

Figure 4:
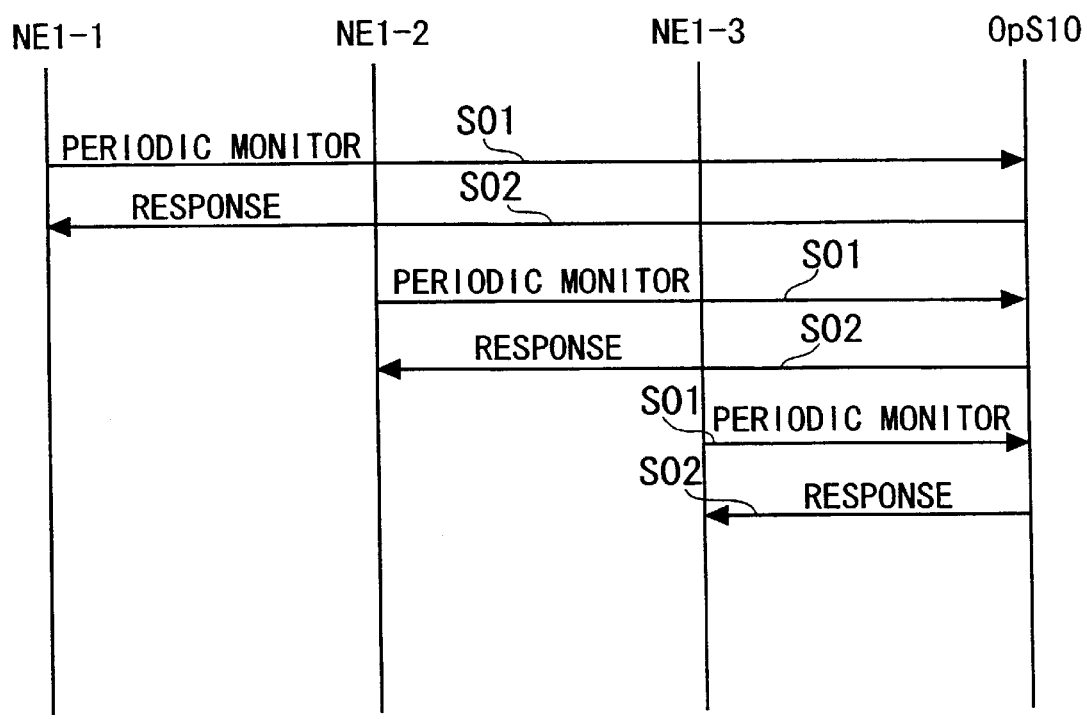
FIG. 4 is a sequence diagram showing how the NE monitors the OpS.

For example, referring to FIG. 4, the NEs 1-1, 1-2, 1-3 in the block 1 transmit the monitor frames to the OpS 10 corresponding thereto (step S01).

The OpS 10, when normally functioning, transmits the response frames responding to the monitor frames to the NEs as monitor frame senders. (step S02).

On the other hand, the sender NE, when transmitting the monitor frame, set a timer for allowing the receipt of the response frame. The sender NE, when receiving the response frame from the OpS 10 before the timer comes to time-out, recognizes that the OpS 10 is normal. In contrast, the sender NE, when receiving no response frame from the OpS 10 before the timer comes to time-out, recognizes that something abnormal occurs in the OpS 10.

Figure 5:
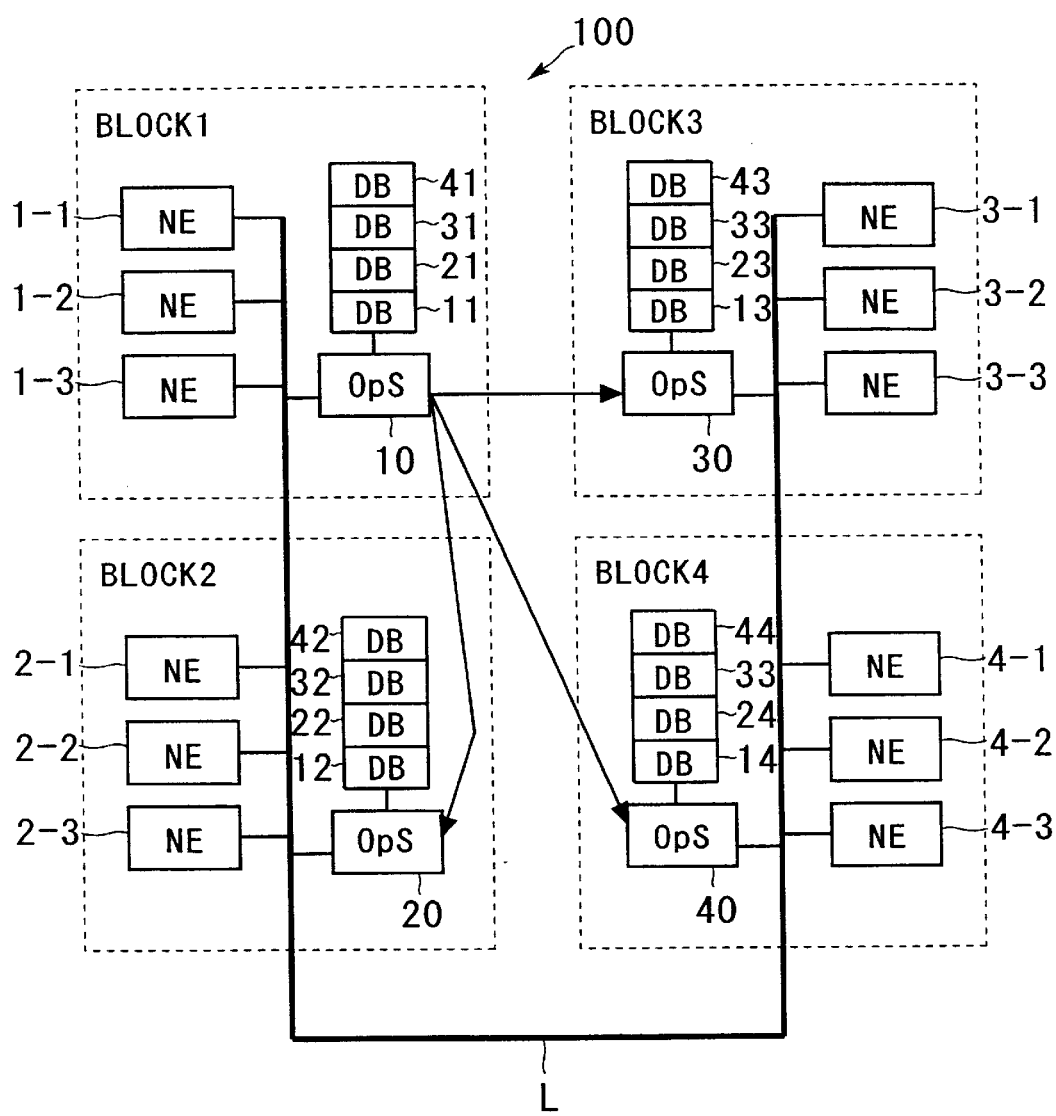
FIG. 5 is an explanatory diagram showing an operational example (synchronization of DBs) in the communications system shown in FIG. 1.

Next, an operational example of the communications system 100 shown in FIG. 1 will be discussed. FIG. 5 is an explanatory diagram showing a normal operation of the system 100. Referring to FIG. 5, the first block information stored in the DB 11 is transferred to the OpSs 20, 30, 40 from the OpS 10. The OpSs 20, 30, 40 stores the corresponding DBs 12, 13, 14 with the first block information in order to synchronize the DBs 11, 12, 13, 14. This enables the communications system 100 to have backup data of the DB 11 in three locations.

Similarly, the second block information stored in the DB 22 is transferred to the OpSs 10, 30, 40 from the OpS 20. The OpSs 10, 30, 40 stores the corresponding DBs 21, 23, 24 with the second block information in order to synchronize the DBs 21, 23, 24. This enables the communications system 100 to have backup data of the DB 22 in three locations.

Likewise, the third block information stored in the DB 33 is transferred to the OpSs 10, 20, 40 from the OpS 30. The OpSs 10, 20, 40 stores the corresponding DBs 31, 32, 34 with the third block information in order to synchronize the DBs 31, 32, 34. This enables the communications system 100 to have backup data of the DB 33 in three locations.

Similarly, the fourth block information stored in the DB 44 is transferred to the OpSs 10, 20, 30 from the OpS 40. The OpSs 10, 20, 30 stores the corresponding DBs 41, 42, 43 with the fourth block information in order to synchronize the DBs 41, 42, 43, 44. This enables the communications system 100 to have backup data of the DB 44 in three locations.

Figure 6:
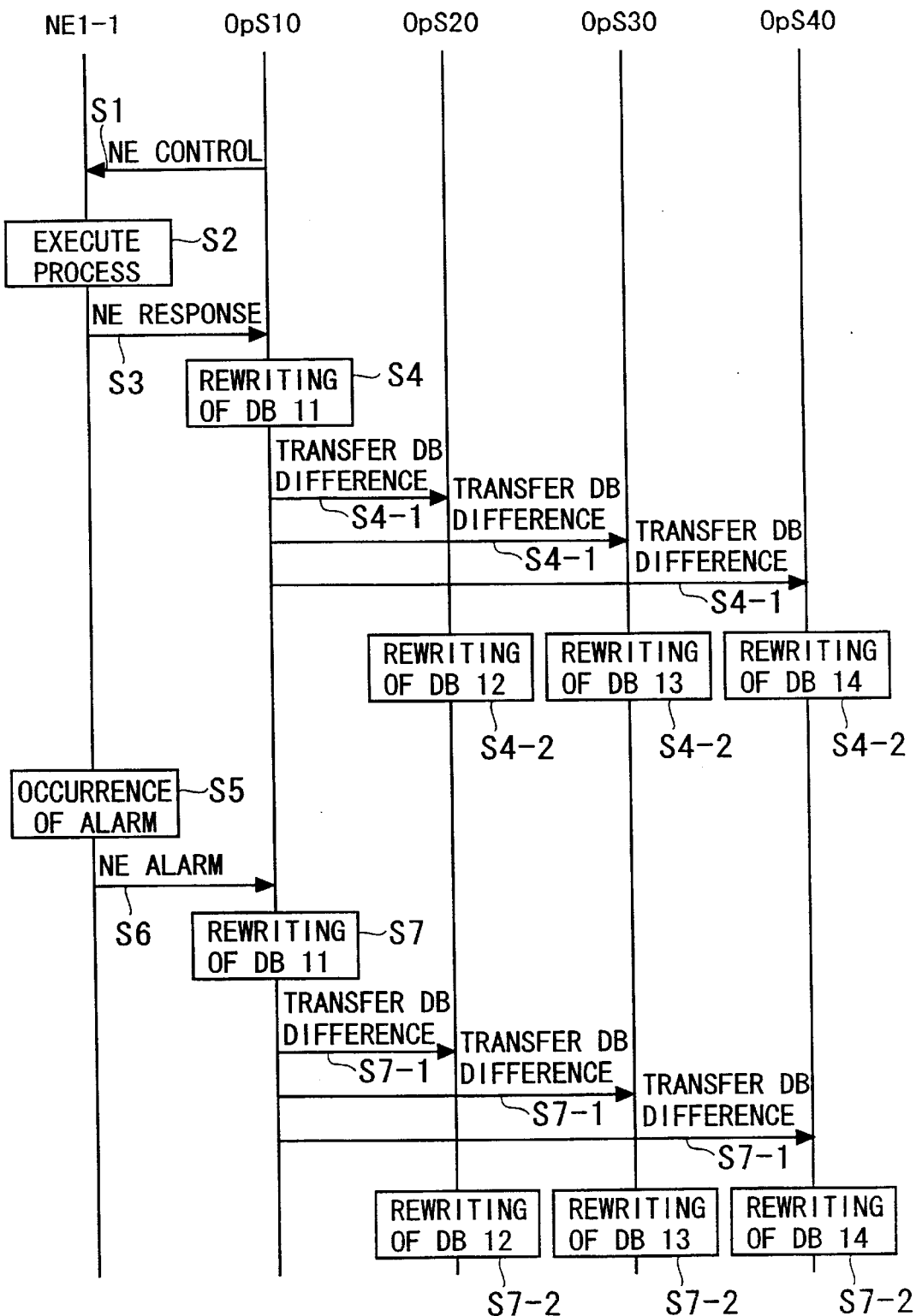
FIG. 6 is an explanatory sequence diagram showing the synchronization of the DBs in the communications system shown in FIG. 1.

FIG. 6 is a sequence diagram showing an example of the operation of synchronizing the DBs in the system 100. FIG. 6 shows the operation of the system 100 when the OpS 10 synchronizes the DBs 11, 12, 13, and 14. The OpS 10, when receiving the result information from the control target NE (which is herein NE 1-1), rewrites the contents in the DE 11 on the basis of this item of result information (steps S1~S4: see FIG. 2).

The contents in the DB 11 are rewritten, whereby difference information occurs in the DE 11. The OpS 10 extracts the difference information out of the DB 11, and transfers the difference information to the OpSs 20, 30, 40 (step S4-1). The OpSs 20, 30, 40, upon receiving the difference information from the OpS 10, rewrites the contents in the DBs 12, 13, 14 by use of the difference information (step S4-2). The DBs 11, 12, 13, 14 are thereby synchronized.

On the other hand, the OpS 10, if receiving the alarm information from the NE (which is herein NE 1-1) with a trouble occurred, rewrites the contents in the DB 11 on the basis of this piece of alarm information (steps S5~S7: see FIG. 3).

The contents in the DB 11 are rewritten, whereby difference information occurs in the DB 11. The OpS 10 extracts the difference information out of the DB 11, and transfers the difference information to the OpSs 20, 30, 40 (step S7-1).

The OpSs 20, 30, 40, upon receiving the difference information from the OpS 10, rewrites the contents in the DBs 12, 13, 14 by use of the difference information (step S7-2). The DBs 11, 12, 13, 14 are thereby synchronized. The OpSs 20, 30, 40 in other blocks 2~4 perform the same operation as that shown in FIG. 6.

Figure 7:
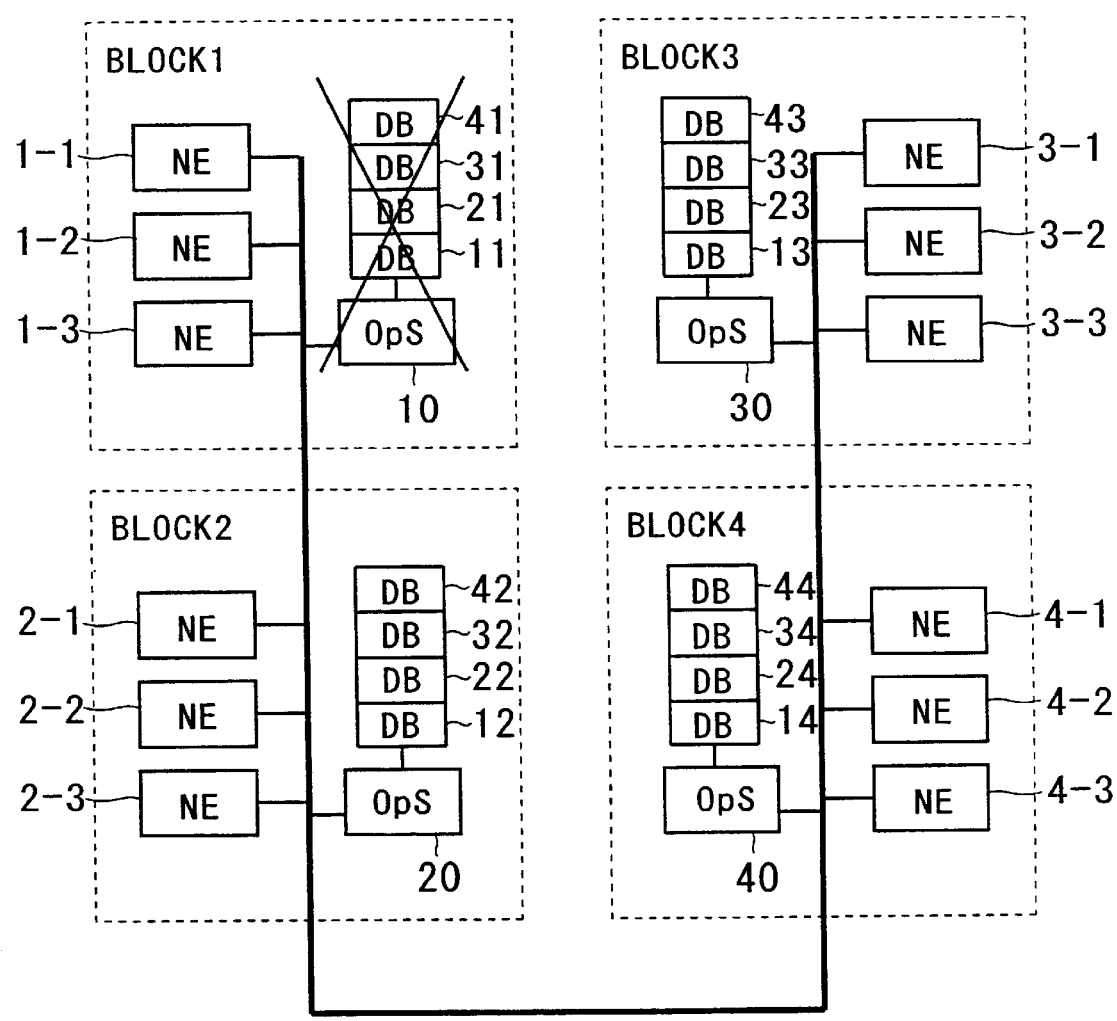
FIG. 7 is an explanatory sequence diagram showing how a trouble occurs in the OpS in the communications system shown in FIG. 1.
Figure 8:
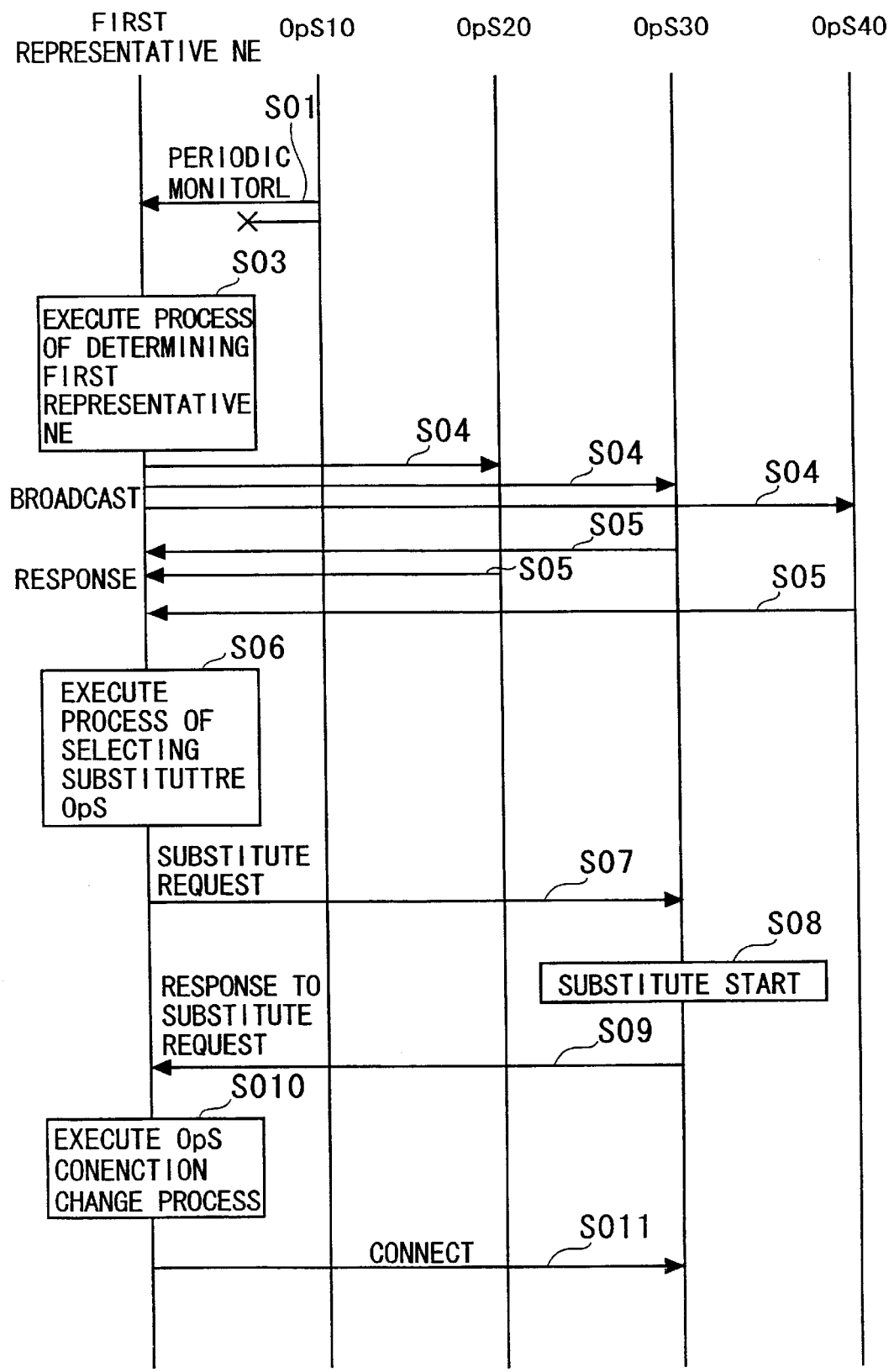
FIG. 8 is a sequence diagram showing an operational example of a (backup) process when the trouble occurs in the OpS in the communications system shown in FIG. 1.

FIG. 7 is an explanatory diagram showing a case where something abnormal (which will hereinafter be simply called a trouble) occurs in a certain OpS in the system 100. FIG. 8 is a sequence diagram showing an operational example of the system 100 when the trouble happens in the OpS. FIGS. 7 and 8 show operational examples in which the trouble occurs in the OpS 10 in the block 1.

Referring to FIG. 8, each of the NEs 1-1, 1-2, 1-3 in the block 1 periodically transmits the monitor frame to the OpS10 and receives the response message to this monitor frame, thereby monitoring the operation of the OpS 10 (confirming a Keep-Alive state of the OpS 10) (see steps S01, S02 in FIG. 4).

If the trouble (e.g., a system-down) occurs in the OpS 10 (see FIG. 7), the OpS 10 is incapable of sending the response message to the monitor frame given from the NE to the sender NE of the monitor frame. Accordingly, the sender NE is, as shown in FIG. 8, unable to receive the response message before the timer comes to time-out. This is a trigger by which the sender NE judges that the trouble occurs in the OpS 10.

The NE, when detecting the trouble in the OpS 10, executes among other NEs a process for determining a first representative NE (which may be called a first representative NE determining process) among other NEs within the same block 1 (step S03).

To be specific, the NE (e.g., NE 1-2) detecting the trouble of the OpS 10 notifies other NEs within the block embracing this NE 1-2 of a first negotiation frame as the first representative NE determining process.

Figure 9:
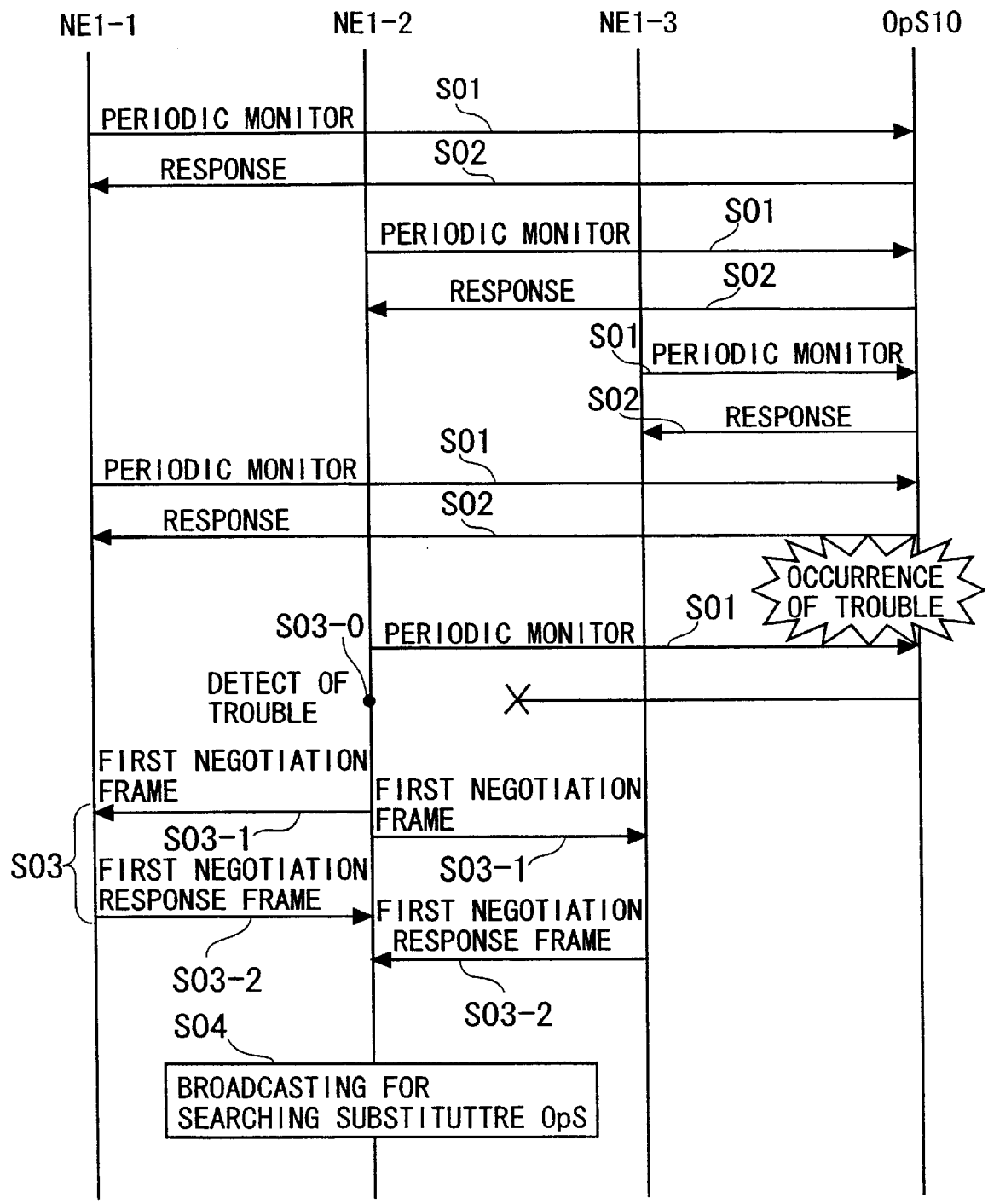
FIG. 9 is a sequence diagram showing an example of a process of determining a first representative NE shown in FIG. 8.

FIG. 9 is a sequence diagram showing an example of the first representative determining process (step S03 including steps S03-3, S03-2) shown in FIG. 8. Referring to FIG. 9, each of the NEs 1-1, 1-2, 1-3 periodically transmits the monitor frame to the OpS 10, thereby monitoring the OpS 10 (steps S01, S02). A transmission timing of the monitor frame between the NEs has a predetermined interval.

The sender NE (e.g., NE 1-2) of the monitor frame, when detecting the trouble of the OpS 10 (step S03-0), generates the first negotiation frame (a first negotiation message), and sends this frame to other NEs (which are herein NE 1-1, 1-3) within the block 1 (step S03-1). The first negotiation frame contains information (negotiation information) for negotiating among the NEs to determine which NE becomes the first representative NE.

The NEs 1-1, 1-3 receiving the first negotiation frame generates a first negotiation response frame responding to the first negotiation frame, and transmits the first negotiation response frame to the NE 1-2 as the sender NE of the first negotiation frame (step S03-2).

In this example, the first negotiation frame contains, as the negotiation information, a piece of information indicating that the sender NE1-2 of the first negotiation frame serving as the first representative NE starts transmitting a broadcast frame BF1 (see FIG. 10A). In this example also, the first negotiation response frame contains a piece of information indicating that the NEs 1-1, 1-3 receiving the first negotiation frame permits the NE 1-2 to transmit the broadcast frame BF1.

Hence, the NE 1-2 as the first representative NE, when receiving the first negotiation response frame, executes broadcasting for searching for a substitute OpS (step S04). The substitute OpS is categorized as an OpS belonging to other blocks 2, 3, 4 and operating (controlling and monitoring), as a substitute for the OpS 10 with the trouble occurred, the NEs 1-1, 1-2, 1-3 within the block 1.

Note that each NE, even when detecting the trouble of the OpS after receiving the first negotiation frame from other NEs, does not transmit the first negotiation frame to other NEs Accordingly, in this example, the NE detecting the trouble of the OpS for the first time within the block becomes the first representative NE.

On the other hand, one other NEs (excluding the sender NE of the first negotiation frame) may become the first representative NE through the negotiation among the NEs. For example, the NE with the minimum load at that point of time may become the first representative NE.

Alternatively, each of the NEs has a table registered beforehand with the information on the first representative NE. When detecting the trouble of the OpS, the table is referred to, and the NE corresponding to the registered information on the first representative NE may become the first representative NE.

Referring back to FIG. 8, the first representative NE (which is here in NE 1-2) generates a broadcast frame (or multicast frame) BF1 for searching for a substitute OpS, and broadcasts (or multicasts) the frame BF1 to other blocks 2, 3, 4.

FIG. 10A is an explanatory diagram showing the broadcast frame BF1. The broadcast frame BF1 contains a trouble-occurred OpS number. The trouble-occurred OpS number is defined as information for specifying the OpS with a trouble occurred (which is herein the OpS 10). The OpS specifying information may also be an address of the OpS.

Each of the OpSs 20, 30, 40, when receiving the broadcast frame BF1, generates a response frame BRF1 to this broadcast frame BF1, and transmits the generated response frame BF1 to the first representative NE (NE 1-2) by use of a address of the sender of the broadcast frame BF1 (step S05).

FIG. 10B is an explanatory diagram showing the response frame BRF1. The response frame BRF1 contains a response OpS number, substitutable/non-substitutable information, CPU load information, CPU capability information, a self-block connected NE count, a self-block accommodating line count, a trouble-occurred block connected NE count and a trouble-occurred block line accommodation count as parameters. Contents of these parameters are as follows:

(a) Response OpS number: A serial number (defined as information for specifying the OpS of the sender of the response frame) of the OpS (response OpS) that responds to the broadcast frame BF1.

(b) Substitutable/non-substitutable information: A flag for indicating whether it is possible to become the substitute OpS.

(c) CPU load information: A CPU availability factor (load information).

(d) CPU capability: A CPU performance (performance information).

(e) Self-block connected NE count: The number of NEs connected to the response OpS.

(f) Self-block accommodating line count: The number of lines accommodated by the plurality of NEs connected to the response OpS.

(g) Trouble-occurred block connected NE count: The number of NEs connected to the trouble-occurred OpS.

(h) Trouble-occurred block accommodating line count: The number of lines accommodated by the plurality of NEs connected to the trouble-occurred OpS.

Referring back to FIG. 8, the first representative NE (NE 1-2), when receiving the response frame BRF1 from each of the OpSs 20, 30, 40, executes a substitute OpS selection process by use of the parameters contained in this response frame BRF1 (step S06).

Figure 11:
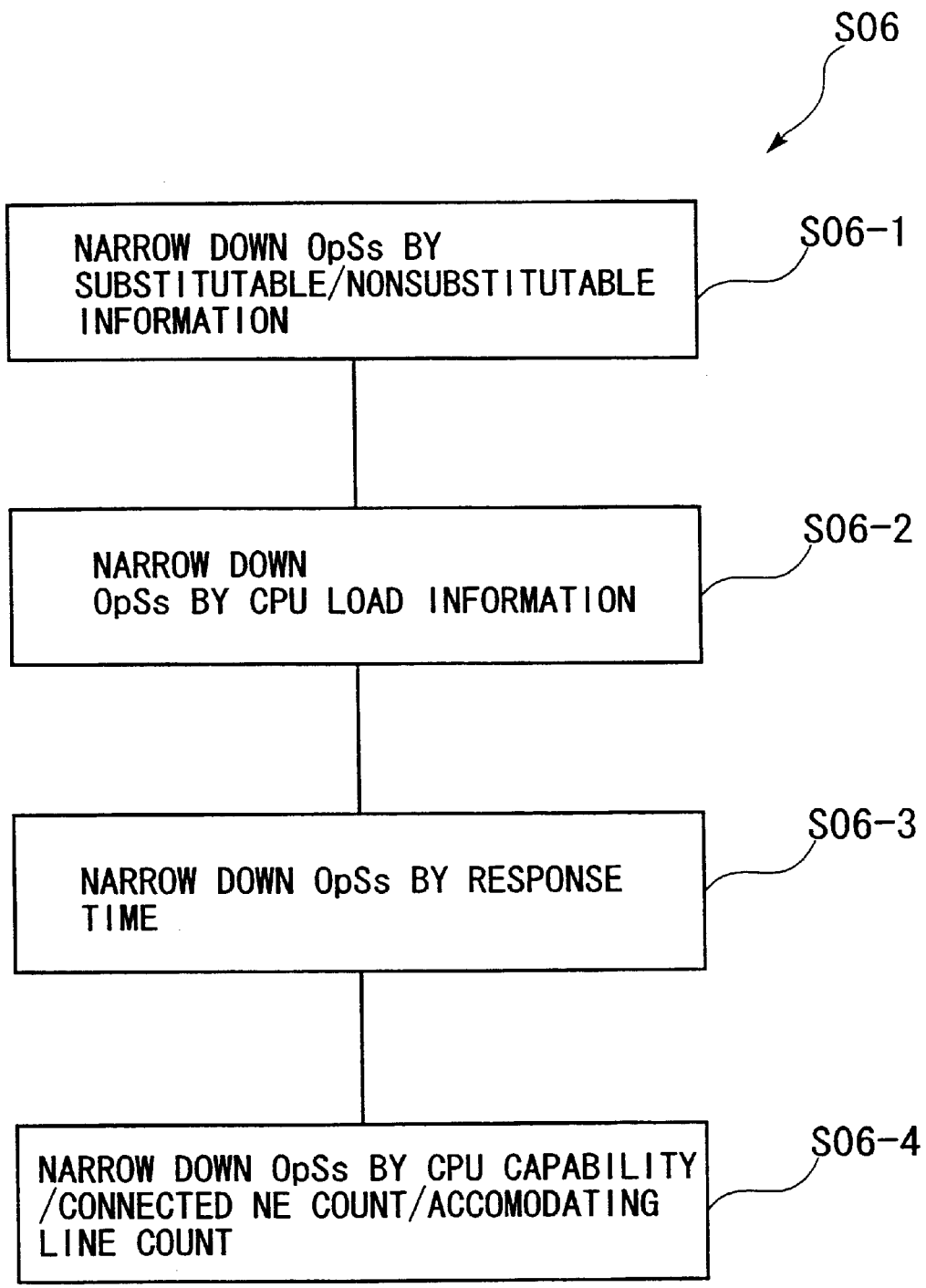
FIG. 11 is a flowchart showing an example of a process of selecting a substitute OpS shown in FIG. 8.

FIG. 11 is a flowchart showing the substitute OpS selection process (step S06). The first representative NE compares and collates the parameters obtained through the response frames BRF1, thereby narrowing down the OpSs by the substitutable/non-substitutable information (step S06-1), narrowing down the OpSs by the CPU load information (step S06-2), narrowing down the OpSs by the response time (step S06-3), and narrowing down the OpSs by the CPU capability/self-block connected NE count/self-block accommodating line count/trouble-occurred block connected NE count/trouble-occurred block line accommodating count (step S06-4). The OpS having an optimal condition is thus selected as the substitute OpS. The sequence of steps S06-1~S06-4 may be arbitrarily set.

Herein, the response time is a time (a response time to the broadcast frame BF1) till the first representative NE receives the response frame BRF1 from each of the OpSs 20, 30, 40 since the first representative NE has transmitted the broadcast frame BF1. Hence, the first representative NE, after transmitting the broadcast frame BF1, counts and records a response time from each of the OpSs 20, 30, 40 by use of a timer incorporated into the NE itself.

Further, the OpS having the optimal condition are, for instance, an OpS with the minimum or a comparatively small load. Note that the first representative NE obtains information on congestion of communication paths between the OpSs 20, 30, 40, and the OpS may be selected based on this item of congestion information in this embodiment.

It is to be noted that the first representative NE may also select the substitute OpS by using at least one of the parameters (a)~(h) given above. For example, the first representative NE may select an OpS as a substitute OpS among the OpSs, at which the response frame BRF1 arrives fastest (the substitute Ops is the OpS exhibiting the shortest response time). In this case, the OpS in the best communication state is selected as the substitute OpS.

Further, at leas one NE in each block has a table previously registered with information on the substitute OpS. When determining the first representative NE, the first representative NE obtains the information on the substitute OpS from the table, and may also select an OpS corresponding to this item of information as the substitute OpS.

Referring again back to FIG. 8, the first representative NE, when selecting the substitute OpS, generates and sends a substitute request frame to the OpS corresponding to the substitute OpS (step S07). In this example, the OpS 30 is selected as the substitute OpS, and the substitute request frame is transmitted to the OpS 30.

The OpS 30, when receiving the substitute request frame starts executing the process as the substitute OpS (step S08), and sends back a substitute request response frame to the substitute request frame (step S09). The substitute request response frame contains information for indicating that the OpS (30) receiving the substitute request frame acknowledges the substitute request and functions as the substitute OpS.

When the first representative NE (1-2) receives the substitute request response frame, each of the NEs 1-1, 1-2, 1-3 executes an OpS connection change process in the block 1 embracing the first representative NE (step S010).

Figure 12:
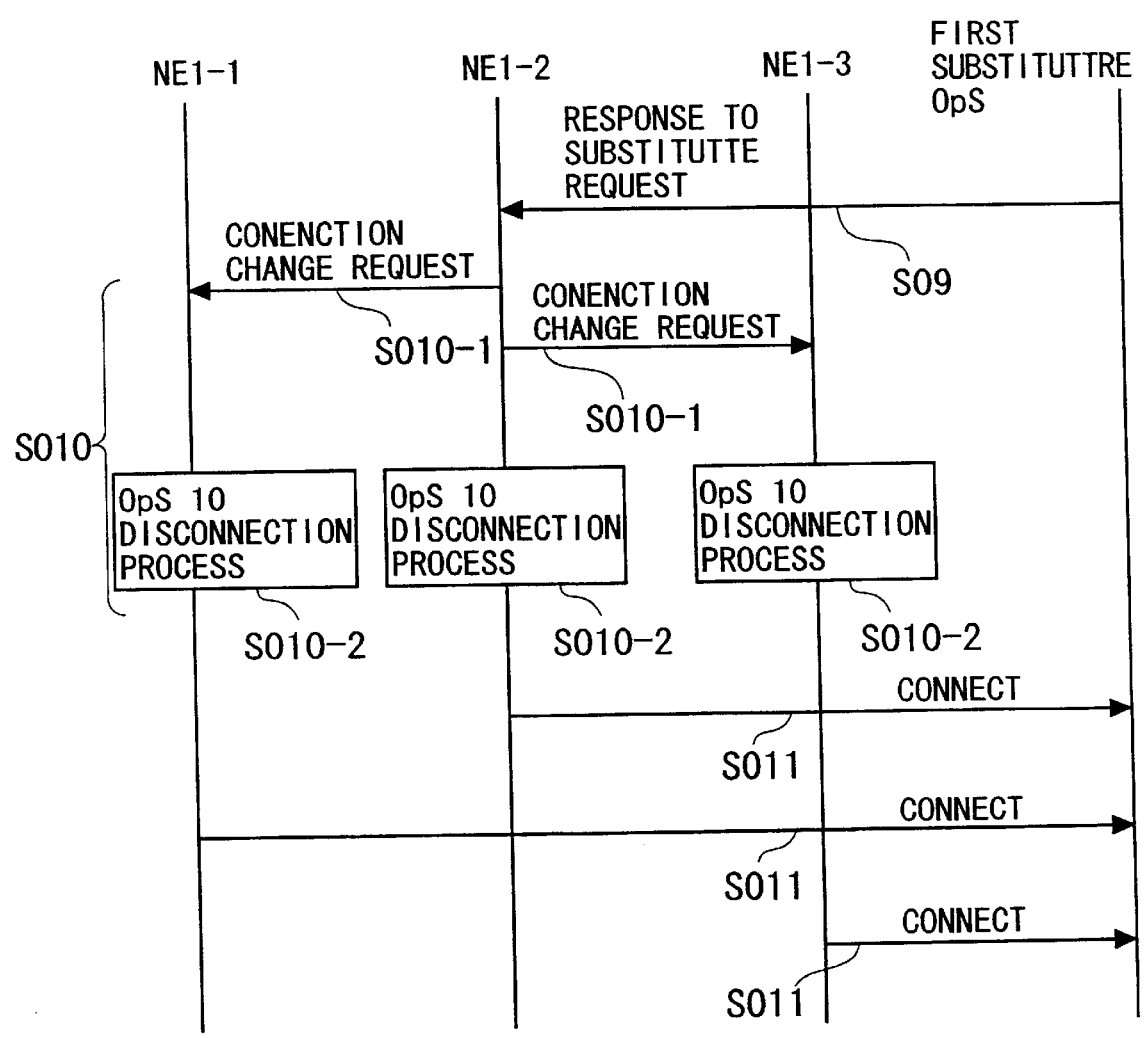
FIG. 12 is a sequence diagram showing an example of an OpS connection change process shown in FIG. 8.

FIG. 12 is a sequence diagram showing the OpS connection change process (step S010). The NE 1-2 as the first representative NE, upon receiving the substitute request response frame from the OpS 30 as the substitute OpS, sends a connection change request to the NEs 1-1, 1-3 of the block 1 (step S010-1). The connection change request is defined as a notification for requesting the logical connection between the NEs 1-1, 1-3 and the OpS to a connection with the substitute OpS (OpS 30) from the connection with the trouble-occurred OpS (failures-detected/failures-having operation system) (OpS 10). The connection change request contains a piece of substitute OpS specifying information (an OpS number or address).

The first representative NE (NE 1-2), after transmitting the connection change request, executes a disconnection process of cutting off the logical connection between the NE 1-2 and the OpS 10 (step S010-2). Further, the NEs 1-1, 1-3 respectively disconnect the logical connections between the NEs 1-1, 1-3 and the OpS 10 (step S010-2).

The disconnection of the logical connections cuts off a relation (administrative relation) in which the OpS 10 operates (controls and monitors) the NEs 1-1, 1-2 and 1-3. Each of the NEs 1-1, 1-2 and 1-3, even after executing the disconnection process, monitors a recovery of the OpS 10 and therefore periodically transmits the monitor frame to the OpS 10.

Thereafter, as shown in FIGS. 8 and 12, each of the NEs 1-1, 1-2 and 1-3 executes a process of establishing the connection between the NE itself and the OpS 30 as the substitute OpS by use of the specifying information on the substitute OpS, which is contained in the response frame BRF1 or the connection change request (step S011). New logical connections (administrative relations) between the NEs 1-1, 1-2, 1-3 and the OpS 30 are thereby established, and the plurality of NEs 1-1, 1-2, 1-3 come under the operation of the substitute OpS.

The OpS 30 as the substitute OpS takes over, as a substitute process, the operation of the plurality of the NEs 1-1, 1-2 and 1-3 from the OpS 10. Namely, the OpS 30 operates, as by the OpS 10, the NEs 1-1, 1-2 and 1-3, and updates the DBs 31 and 33 corresponding to the OpS 30 itself.

With this processing, the OpS 30 substituting the OpS 10 accumulates the first block information on the DB 31. Further, the OpS 30, each time the OpS 30 updates the DB 31, transfers a difference (information) generated by this updating to other OpSs 20 and 40. The DBs 21, 31 and 41 accumulating with the first block information are thereby initialized.

Next, an operational example of the communications system 100 when the trouble-occurred OpS (failures-detected OpS) is restored, will be explained.

Figure 13:
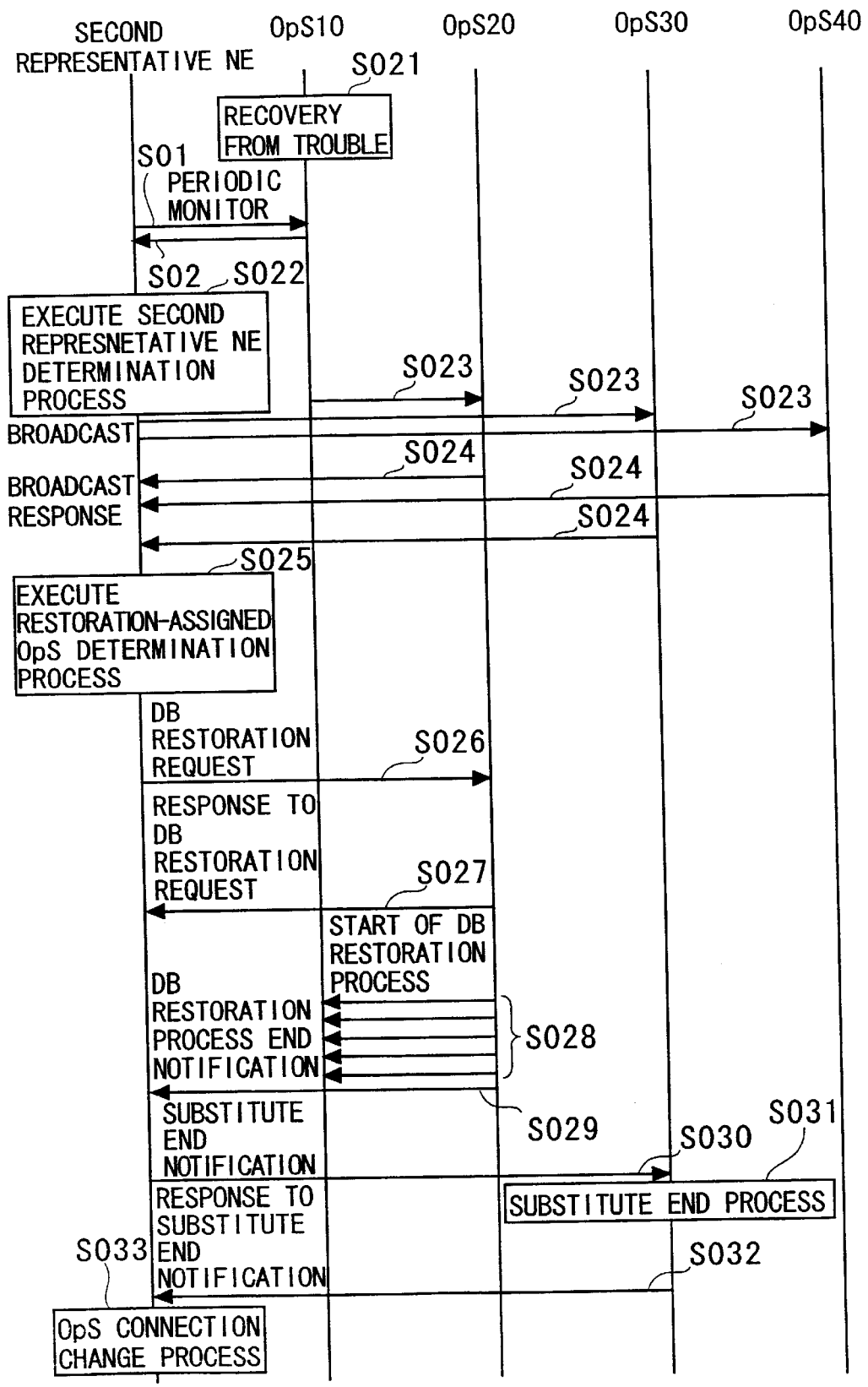
FIG. 13 is a sequence diagram showing an operational example of a (DB restoration) process when the OpS recovers from the trouble in the communications system shown in FIG. 1.
Figure 14:
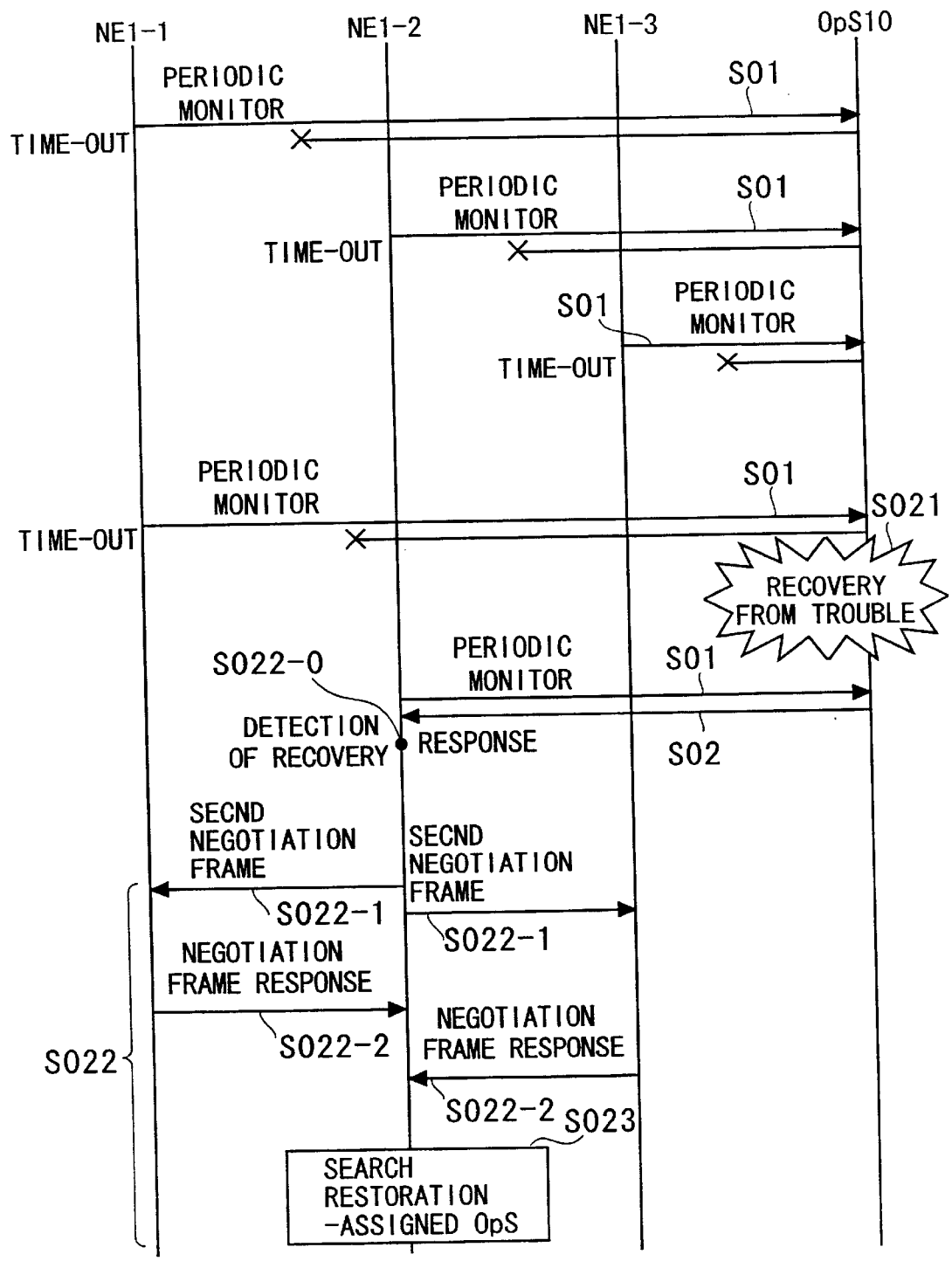
FIG. 14 is a sequence diagram showing an example of a process of determining a second representative NE shown in FIG. 13.

FIG. 13 is a sequence diagram showing an operation of the system 100 when the OpS is restored in the operational example shown in FIGS. 7 and 8. FIG. 14 is a sequence diagram showing a second representative NE determination process (step S022).

Each of the NEs 1-1, 1-2, 1-3 in the block 1, even after the disconnection process (step S010-2), periodically sends the monitor frame to the OpS 10, and accepts a response message to this monitor frame (step S01). With this acceptance, each of the NEs 1-1, 1-2, 1-3 monitors a recovery of the OpS 10. On the other hand, the OpS is, when recovered from the troubling state (step S021), capable of sending the response frame to the monitor frame.

Each of the NEs 1-1, 1-2, 1-3, upon receiving the response frame from the OpS 10, recognizes that the OpS 10 has recovered from the troubling state, and executes the second representative NE determination process (step S022). Namely, each of the NEs 1-1, 1-2, 1-3, when detecting the recovery of the OpS 10 (step S022-0), transmits a second negotiation frame (a second negotiation message) to other NEs in the block 1 (step S022-1).

In the example shown in FIG. 14, the NE 1-2 detects the recovery of the OpS 10 and transmits the second negotiation frame to other NEs 1-1, 1-3. The second negotiation frame contains information for negotiating (negotiation information) among the NEs to determine which NE becomes the second representative NE.

The NEs 1-1, 1-3 receiving the second negotiation frame generate a second negotiation response frame to the second negotiation frame, and send this response frame to the NE 1-2 (step S022-2). In this example, the second negotiation frame contains information indicating that the NE1-2 as a sender of the second negotiation frame becomes the second representative NE. A second negotiation response frame contains information indicating that the NEs 1-1, 1-3 receiving the second negotiation frame acknowledge that the NE 1-2 becomes the second representative NE.

Accordingly, the NE 1-2 as the second representative NE, upon receiving the second negotiation response frame, executes broadcasting for searching for a restoration-process-assigned OpS (step S023). The restoration-assigned OpS is categorized as an OpS in charge of a process of restoring the DBs 11, 21, 31, 41 in the block 1.

Note that each NE, when receiving the second negotiation frame from other NEs, does not send the second negotiation frame to other NEs even if detecting the recovery of the OpS after receiving the second negotiation frame. Hence, in this example, the NE, which is the first to detect the recovery of the OpS in the block, becomes the second representative NE.

In contrast, one of other NEs (excluding the sender NE of the second negotiation frame) may become the second representative NE by the negotiation among these NEs. The alternative is such that the information on the second representative NE is registered beforehand in the respective NEs in each block, and, when the recovery of the OpS is detected, the NE corresponding to the registered information about the second representative NE may become the second representative NE.

The second representative NE (which is herein NE 1-2) generates a broadcast frame (or multicast frame) BF2 for searching for a restoration target OpS, and broadcasts (multicasts) this frame BF2 to other blocks 2, 3, 4 (step S023)

Figure 15A:
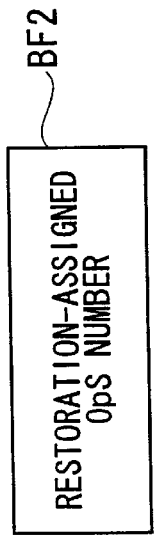
FIG. 15A is an explanatory diagram showing the broadcast frame.

FIG. 15A is an explanatory diagram showing the broadcast frame BF2. The broadcast frame BF contains a restoration target OpS number. The restoration target OpS number is defined as a piece of information for specifying an OpS (which is herein a restoration target OpS 10) recovered from the troubling state. The OpS specifying information may also be an OpS address.

Referring back to FIG. 13, each of the OpSs 20, 30, 40, when receiving the broadcast frame BF2, generates a response frame BRF2 to this broadcast frame BF2, and transmits the generated response frame BF2 to the second representative NE (1-2) by use of an address of the sender of the broadcast frame BF2 (step S024).

Figure 15B:
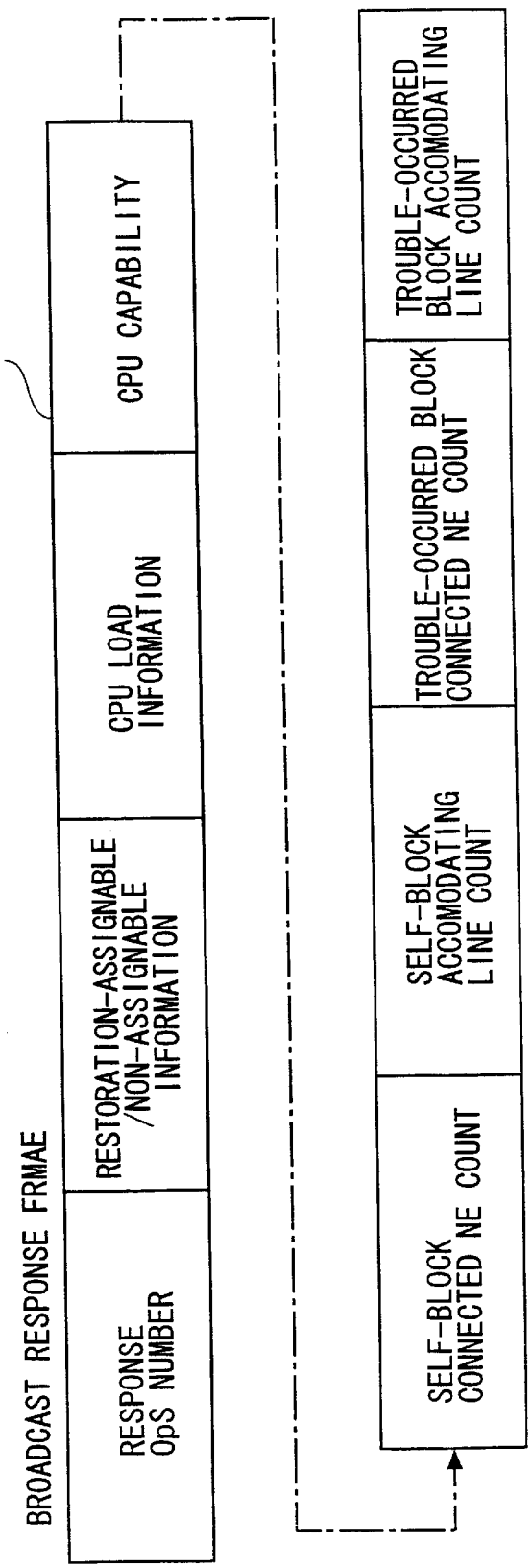
FIG. 15B is an explanatory diagram showing an example of the broadcast response frame.

FIG. 15B is an explanatory diagram showing the response frame BRF2. The response frame BRF2 has substantially the same parameters as those of the response frame BRF1 except that the substitutable/non-substitutable information is replaced with restoration-assignable/non-assignable information. The restoration-assignable/non-assignable information is a flag for indicating whether it is possible to become the restoration-assigned OpS.

Referring back to FIG. 13, the second representative NE (1-2), when receiving the response frame BRF2 from each of the OpSs 20, 30, 40, executes a process of selecting the restoration-assigned OpS by use of the parameters contained in the response frame BRF2 (step S025).

Figure 16:
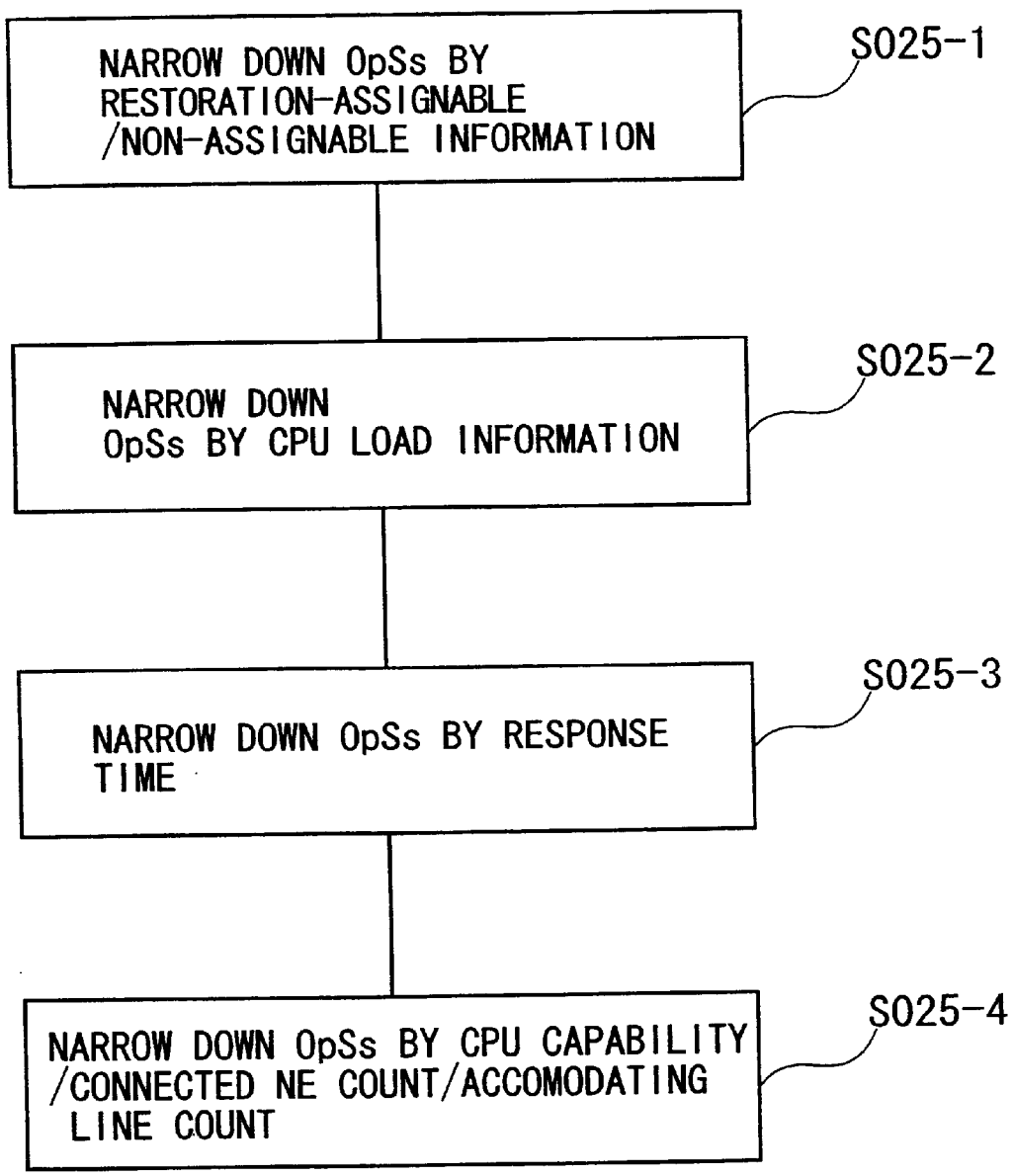
FIG. 16 is a flowchart showing an example of a process of selecting a restoration-assigned OpS shown in FIG. 13.

FIG. 16 is a flowchart showing the restoration-assigned OpS selection process (step S025). The second representative NE executes substantially the same process as the substitute OpS selection process (step S06) by use of the parameters obtained through the response frame BRF2 given from each of the OpSs 20, 30, 40, thereby selecting or determining the restoration-assigned OpS.

Namely, the second representative NE narrows down the OpSs by the restoration-assignable/non-assignable information (step S025-1), narrows down the OpSs by the CPU load information (step S025-2), narrows down the OpSs by the response time (step S025-3), and narrows down the OpSs by the CPU capability/self-block connected NE count/self-block accommodating line count/trouble-occurred block connected NE count/trouble-occurred block line accommodating count (step S025-4). The OpS having an optimal condition is thus selected or determined as the restoration-assigned OpS. Note that a variety of methods explained so far by way of the substitute OpS selection method can be applied to a method of selecting the restoration-assigned OpS. Further, it is preferable that the second representative NE be structured to select an OpS, as the restoration-assigned OpS, different from the substitute OpS. This contrivance prevents both of a load concentration on one single OpS and a decline of performance of the OpS.

Referring again back to FIG. 13, the second representative NE, when selecting the restoration-assigned OpS, generates a DB restoration request frame and transmits the OpS serving as the restoration-assigned OpS (step S026). In this example, the OpS 20 is selected as the restoration-assigned OpS, and the DB restoration request frame is transmitted to the OpS 20.

The OpS 20, upon receiving the DB restoration request frame, executes a DB restoration process as the restoration-assigned OpS (step S028). Namely, the OpS 20 reads first through fourth block information accumulated in the DBs 21, 22, 23, 24, and transfers the same block information to the OpS 10. The OpS 10 stores the DBs 11, 21, 31, and 41 with the first to fourth block information received from the OpS 20. The contents accumulated in the DBs 11, 12, 13, 14 in the block 1 are thereby synchronized with the plurality of DBs in other blocks 2, 3, and 4. Thus, the DBs 11, 12, 13 and 14 in the block 1 are restored.

The OpS 20, when finishing the DB restoration process, transmits a DB restoration process end notification to the NE 1-2 as the second representative NE (step s029). The second representative NE, when receiving the DB restoration process end notification, transmits a substitute end notification to the OpS 30 as the substitute OpS (step S030).

The OpS 30, upon receiving the substitute end notification, executes a substitute end process (step S031).

That is, the OpS 30 finishes the process for operating the NEs 1-1, 1-2, 1-3. Thereafter, the OpS 30 transmits a response notification to the substitute end notification to the NE 1-2 as the second representative NE (step S032).

Figure 17:
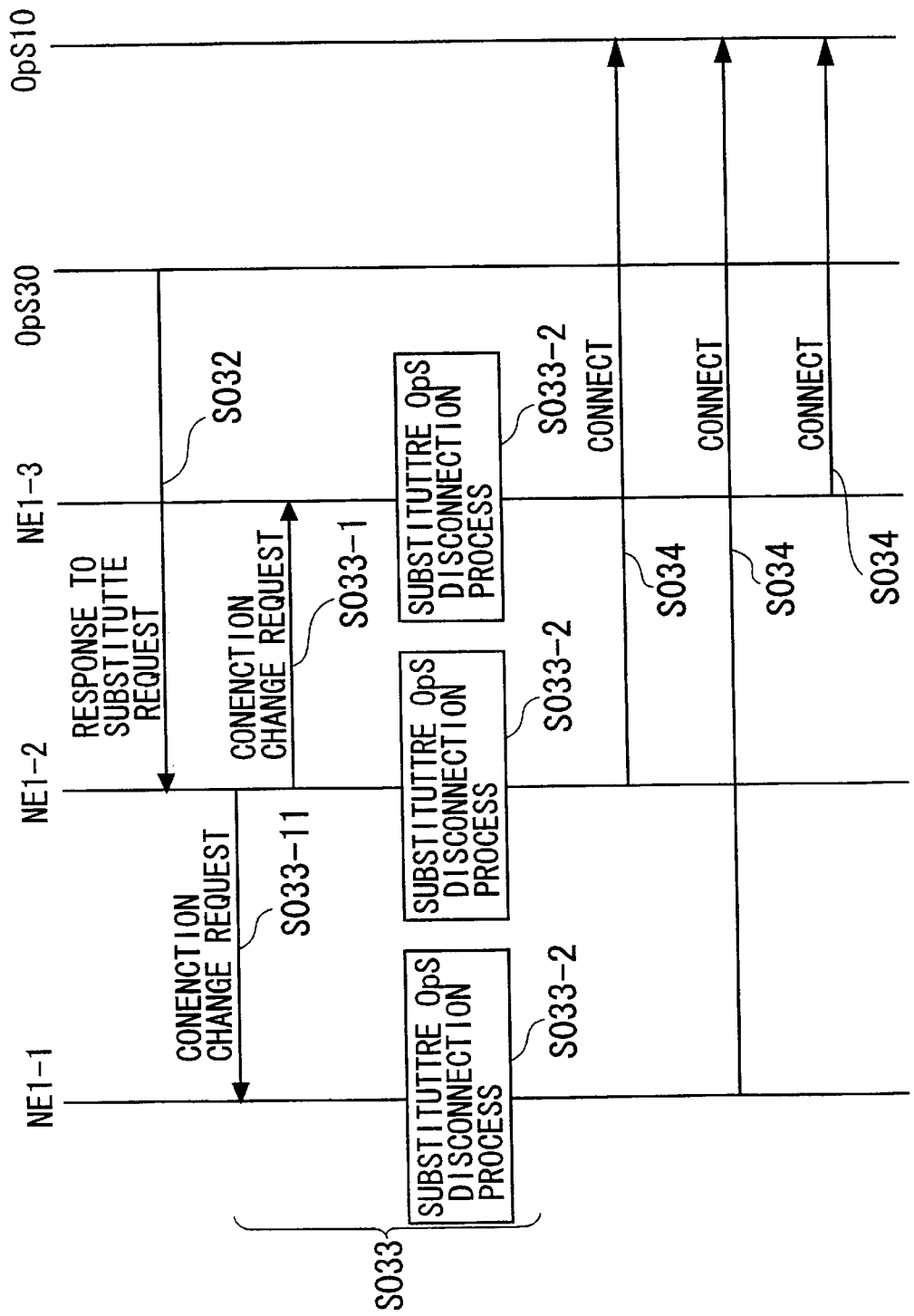
FIG. 17 is a sequence diagram showing an example of an OpS connection change process shown in FIG. 13.

The NE 1-2 as the second representative NE, upon receiving the response notification, executes the OpS connection change process (step S033) FIG. 17 is a sequence diagram showing the OpS connection change process (step S033). The NE 1-2, when receiving the response notification from the OpS 30, sends a connection change request to the NEs 1-1, 1-3, thereby requesting the NEs 1-1, 1-3 to change the connection relationship between the NEs 1-1, 1-3 and the OpS to the connection with the previous OpS (OpS 10) from the connection with the substitute OpS (OpS 30) (step s033-1).

The NE 1-2, transmitting the connection change request, executes a process of cutting off the connection relationship between the NE 1-2 and the OpS 30 (step S033-2). Further, the NEs 1-1, 1-3, when receiving the connection change request, cut off the connection relationship between NEs 1-1, 1-3 and the OpS 30 (step S033-2). Thus, the NEs 1-1, 1-2, 1-3 get released from under the operation of the substitute OpS.

Thereafter, the NEs 1-1, 1-2, 1-3 execute the process of establishing the connections between the NEs and the OpS 10 (step S034). With this process executed, a state of the block 1 reverts to the state before the trouble occurs in the OpS 10.

According to the communications system 100 in the embodiment of the present invention, in each block (defined as a group consisting of the OpS and the NEs operated by this OpS), when each NE detects the trouble in the OpS by monitoring the OpS, the first representative NE is determined among the plurality of NEs in this block. The first representative NE selects the substitute OpS, and sends the substitute request (corresponding to an [operation request]) to the selected substitute OpS. Then, the plurality of NEs (that are all the NEs in the block including the OpS with its trouble detected) under the operation of the OpS with the trouble detected, come under the operation of the substitute OpS.

Thus, according to the communications system 100, if a certain OpS (administrative system) is incapable of functioning due to its trouble, other OpS as the substitute OpS takes over the operation of the NEs, thereby backing up the OpS.

This backup process is actualized by the NE that monitors the OpS and executes the first representative NE determination process, the substitute OpS selection process, the substitute request transmission process and the process of establishing the connection to the substitute OpS. Thus, the backup process is actualized the NE as a prime implementer.

Accordingly, unlike the prior art, there is no necessity for providing the host OpS in the communications system 100, and it is therefore feasible to restrain a rise in the operating cost for the communications system 100. Further, there is no possibility in which a load on the OpS increases and the OpS performance decreases due to mutual monitoring between the OpSs.

Moreover, the first representative NE dynamically selects the substitute OpS by using the response frame BRF1 and the information (the parameters (a)~(h)) contained in this response frame BRF1. For example, the substitute OpS is selected based on the CPU load information, whereby the OpS exhibiting the minimum load at this point of time is selected. The alternative is that the substitute OpS is selected based on the response time, whereby an OpS exhibiting the best communication state (traffic state) (the highest throughput) is selected. Thus, the optimal OpS is selected as the substitute OpS, and the substitute OpS executes the substitute process. The communications system 100 is thereby well operated.

Further, the substitute OpS, in the substitute process, accumulates on its own database the operation information (the first block information in the illustrated example) on the NEs coming newly under the operation of the substitute OpS itself, and transfers the operation information to other OpSs, thereby actualizing the synchronization of the first block information between the databases excluding the database corresponding to the OpS with the trouble detected.

As described above, after the substitute OpS has been determined, the logical connection of the NEs in the block embracing the OpS with its trouble occurred, is changed to the connection with the substitute OpS. Hence, the databases of the OpS in the operation block are held by the OpSs in other blocks, and the change difference information is transferred to the OpSs in other blocks, whereby several OpSs have the databases at all times. This architecture actualizes that the OpSs perform the backup function each other.

Thereafter, if the OpS with the trouble detected is recovered, the second representative NE is determined. The second representative NE selects the restoration-assigned OpS, and the restoration process is executed between the restoration-assigned OpS and the OpS with its recovery detected, and the plurality of databases accommodated in the OpS with its recovery detected are restored. Then, the substitute process is finished, the plurality of NEs operated by the substitute process get released from under the operation of the substitute OpS and come (return to) under the operation of the OpS with the recovery detected. The state of the communications system 100 thereby reverts to the state (conceived optimal) before the trouble occurs in the OpS.

The present invention having the architecture described above can exhibit the following effects.

<1> If the trouble occurs in the OpS, the optimal OpS is dynamically selected corresponding to the load on each OpS and the state of the monitor control network, and the logical connection of the NEs operated by the OpS with the trouble occurred is changed to the connection with the substitute OpS. This actualizes the exact recovery of the monitor control network (the communications system) under the minimum influence upon the monitor control system (the communications system).

<2> The substitute OpS determination process is actualized by the communications device (NE: network element) as the monitor/control target device, thereby actualizing the reduction in the load upon each of the OpSs.

<3> There is no necessity for separately installing and operating the host OpS in order to confirm the normality of each OpS, thereby actualizing the reduction in the operating cost.

<4> When the OpS is recovered from the trouble, the optimal OpS in charge of restoring the DBs is dynamically selected corresponding to the load upon each OpS and the state of the monitor control network, and the restoration process of the DBs of the OpS recovered from the trouble is actualized under the minimum influence on the monitor control system (the communications system).

Further, according to this embodiment, the following architecture may be added. To be specific, when configuring the communications system 100 in the embodiment, if the OpS and the NE are booted at the same time, a startup time of the OpS might be longer than a startup tome of the NE.

In this case, eve when the NE sends the monitor frame to the OpS, the OpS does not yet get ready for transmitting the response frame and is therefore unable to send the response frame to the NE. In this instance, the NE might mistakenly detect the trouble in the OpS. To give a troubleshooting scheme, the NE implements a function (a frame transmission restraining function) of restraining the first negotiation frame (the negotiation message) from being transmitted to other NEs and restraining the broadcast frame BF1 from being sent to other OpSs till a startup notification is received from the OpS even when detecting the trouble in the OpS. A processor incorporated into the NE executes a predetermined program, whereby this function can be actualized.

Figure 18:
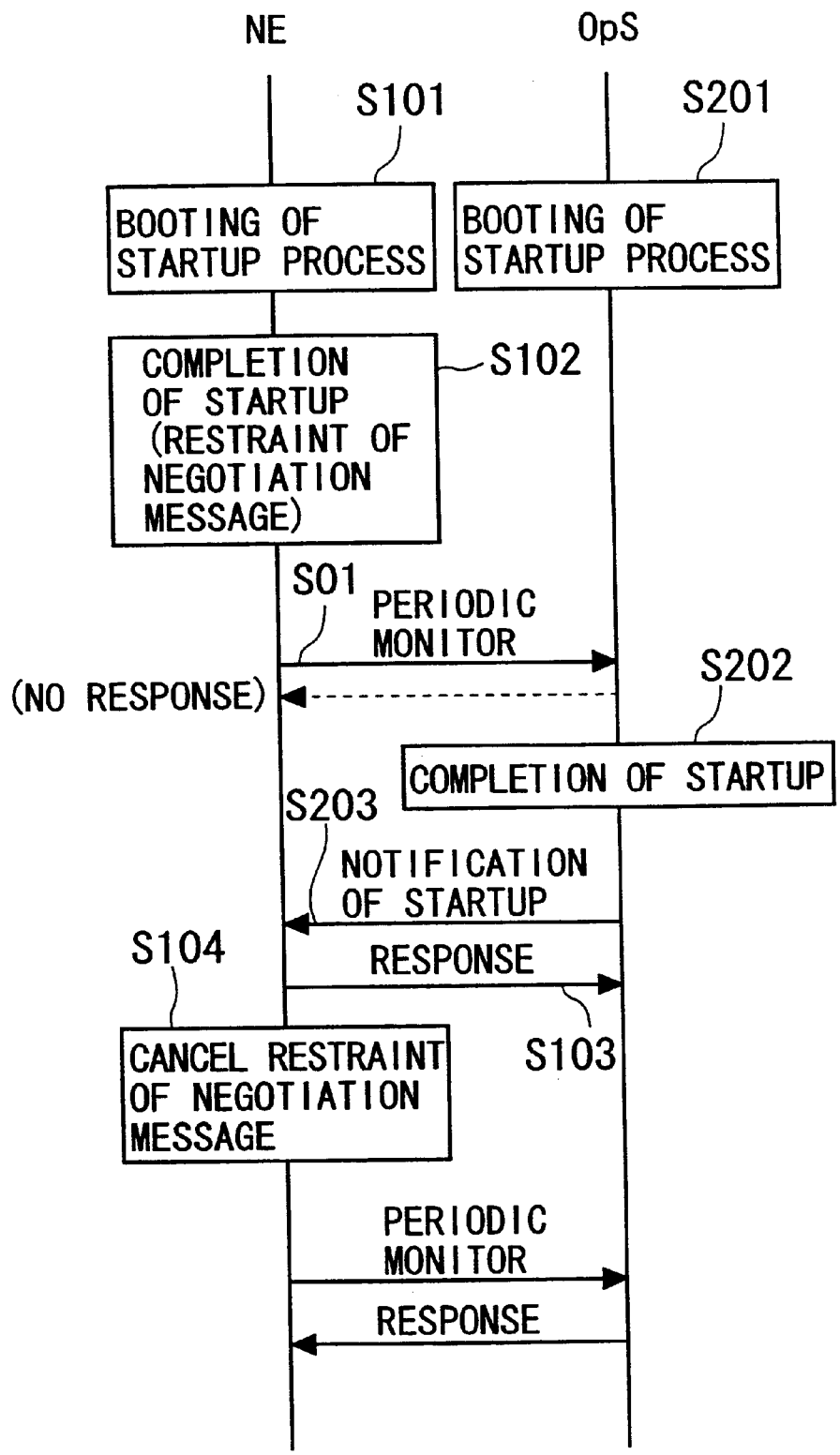
FIG. 18 is an explanatory sequence diagram showing another embodiment.

FIG. 18 is an explanatory sequence diagram showing the frame transmission restraining function. For example, when configuring the communications system 100, it is assumed that the NE and the OpS are started up (booted) simultaneously (S101, S201). The NE, upon booting, gets ready for transmitting the monitor frame to the OpS, while the OpS, upon booting, gets ready for sending the response frame back to the NE.

In this case, if the NE comes to a completion of the preparation faster than OpS, the NE starts transmitting periodically the monitor frame to the OpS. Just when the NE comes to the completion of the preparation, however, a trouble detection inhibiting flag (a negotiation message restraining message), set in the NE, for restraining (inhibiting) the detection of the trouble in the OpS, is in an ON-state (wherein the trouble detection (the transmission of the first negotiation frame) is inhibited).

Therefore, the NE transmits the monitor frame to the OpS (S01) and, even if unable to receive the response frame within a predetermined period, does not detect the trouble in the OpS. Thereafter, when the OpS completes the preparation (S202), the OpS sends a completion-of-preparation notification (a completion-of-startup notification) to the NE (S203).

The NE, when receiving the completion-of-preparation notification from the OpS, transmits to the OpS a notification of response thereto (S103), and sets the trouble detection inhibition flag OFF (in a state that permits the detection of the trouble) (S104). With this setting, the NE, if unable to receive the response frame within a predetermined period since the monitor frame has been sent, detects the trouble in the OpS and transmits the first negotiation frame. On the other hand, the OpS, after transmitting the completion-of-preparation notification, sends back the response frame with respect to the monitor frame given from the NE. This architecture prevents the NR from mistakenly detecting the trouble in the OpS.

What is claimed is:

1. A backup system for an operation system in a communications system, comprising:

a plurality of operation systems connected to each other via a network; and a plurality of network elements operated by the plurality of operation systems, wherein each of the operation systems operates at least one of the plurality of network elements, each of the network elements monitors the operation system that operates the network element itself and detects failures in this operation system, when the failures are detected, if the failures-detected operation system operates a plurality of network elements, a representative network element is determined among the plurality of network elements under the failures-detected operation system, the representative network element selects a substitute operation system among the other operation systems and transmits an operation request to the substitute operation system, and each of the operation systems, when receiving the operation request, as the substitute operation system, operates the plurality of network elements under the failures-detected operation system.

2. A backup system for an operation system in a communications system according to claim 1, wherein the representative network element respectively transmits a frame for selecting the substitute operation system to the other operation systems before sending the operation request, each of the other operation systems, when receiving the frame, transmits a response frame to the frame to the representative network element, and the representative network element receives the response frames respectively from the other operation systems, and selects, as the substitute operation system, the other operation system detected as a sender of the response frame received first by the representative communication system.

3. A backup system for an operation system in a communication system according to claim 2, wherein each of the network elements, if the failures-detected operation system operates only the network element itself, transmits an operation quest to a substitute operation system selected from the other operation systems, when the other operation system is detected, and each of the operation systems, when receiving an operation request, operates as the substitute operation system for the sender network element of the operation request.

4. A backup system for an operation system in a communications system according to claim 1, wherein the representative network element respectively transmits a frame for selecting the substitute operation system to the other operation systems before sending the operation request, each of the other operation systems, when receiving the frame, transmits a response frame to the frame to the representative network element, and the representative network element receives the response frames respectively from the other operation systems, and selects the substitute operation system by use of information contained in these response frames.

5. A backup system for an operation system in a communications system according to claim 1, wherein each of the operation systems has a plurality of databases corresponding respectively to the plurality of operation systems, updates the database corresponding to the operation system itself by use of information obtained by operating at least one network element under the operation system itself, transfers difference information generated by the updating to the all other operation systems, if receiving the difference information from the other operation system, updates the database corresponding to the other operation system by use of the received difference information, further updates, if operating as a substitute operation system at least one network element under the failures-detected operation system, the database corresponding to the failures-detected operation system by use of the information obtained by operating the at least one network element, and transfers difference information generated by the updating to the all other operation systems or the other operation systems excluding the failures-detected operation system.

6. A backup system for an operation system in a communications system according to claim 5, wherein the plurality of network elements where the operation system has changed, while being operated by the substitute operation system, respectively monitor the failures-detected operation system, determine, when any one of the plurality of network elements detects a recovery of the failures-detected operation system, a second representative network element from the plurality of network elements, wherein the second representative network element selects, from the plurality of other operation systems, a restoration-assigned operation system assigned a process of restoring the plurality of databases included in the failures-detected operation system, and transmits a restoration request for restoring the databases of targets to the restoration-assigned operation system, the restoration-assigned operation system, when receiving the restoration request, transfers contents accumulated in the plurality of databases included in the restoration-assigned operation system to the failures-detected operation system, and the failure-detected operation system, when receiving the accumulated contents from the restoration-assigned operation system, updates respectively the plurality of databases under itself by use of the accumulated contents.

7. A backup system for an operation system in a communications system according to claim 6, wherein the second representative network element, before transmitting the restoration request, transmits a frame for selecting the restoration-assigned operation system to the other operation systems, each of the other operation systems, when receiving the frame, respectively transmits a response frame corresponding to the frame to the second representative network element, and the second representative network element receives the response frames respectively from the other operation systems, and selects, as a restoration-assigned operation system, the other operation system detected as a sender of the response frame received first by the second representative communication system.

8. A backup system for an operation system in a communications system according to claim 6, wherein the second representative network element, before transmitting the restoration request, transmits a frame for selecting the restoration-assigned operation system to the other operation systems, each of the other operation systems, when receiving the frame, respectively transmits response frame corresponding to the frame to the second representative network element, and the second representative network element receives the response frames respectively from the other operation systems, and selects a restoration-assigned operation system by use of information contained in these response frames.

9. A backup system for an operation system in a communications system according to claim 6, wherein the second representative network element selects, as a restoration-assigned operation system, the operation system not selected as the substitute operation system, from the other operation systems.

10. A backup system for an operation system in a communications system according to claim 6, wherein the network element which is the first to detect the recovery of the operation system among the plurality of network elements monitoring the failures-detected operation system, becomes the second representative network element.

11. A backup system for an operation system in a communications system according to claim 1, wherein the network element, which is the first to detect the failures in an operation system among a plurality of network elements under this operation system, becomes the representative network element.

12. A backup system for an operation system in a communications system according to claim 1, wherein the plurality of network elements where the operation system has changed to the substitute operation system, monitor the failures-detected operation system and if any one of the plurality of network elements detects a recovery of the failures-detected operation system, the plurality of network elements get released from under the operation of the substitute operation system and return to under the operation of the recovered failures-detected operation system.

13. A backup system for an operation system in a communications system according to claim 1, wherein each of the network elements transmits a monitor frame to the operation system that operates the network element itself, monitors the operation system by receiving a response frame to this monitor frame from the operation system, and detects failures in the operation system only in a case where the response frame is not received before an elapse of a predetermined period since the monitor frame has been transmitted, and where a notification showing a completion of a preparation for sending the response frame has already been received from the operation system.

14. A backup method for an operation system in a communications system, comprising
a plurality of operation systems connected to each other via a network, and
a plurality of network elements operated by the plurality of operation systems,
the method comprising steps of:
operating each of the operation systems operates at least one of the plurality of network elements;
operating each of the network elements monitors the operation system that operates the network element itself and detects failures in this operation system, when the failures are detected, if the failures-detected operation system operates a plurality of network elements, a representative network element is determined among the plurality of network elements under the failures-detected operation system, the representative network element selects a substitute operation system among the other operation systems and transmits an operation request to the substitute operation system; and
operating each of the operation systems, when receiving the operation request, as the substitute operation system, operates the plurality of network elements under the failures-detected operation system.

15. A backup method for an operation system in a communications system according to claim 14, wherein the representative network element respectively transmits a frame for selecting the substitute operation system to the other operation systems before sending the operation request,
each of the other operation systems, when receiving the frame, transmits a response frame to the frame to the representative network element, and
the representative network element receives the response frames respectively from the other operation systems, and selects, as the substitute operation system, the other operation system detected as a sender of the response frame received first by the representative communication system.

16. A backup method for an operation system in a communications system according to claim 15, wherein each of the network elements, if the failures-detected operation system operates only the network element itself, transmits an operation request to a substitute operation system selected from the other operation systems, when the other operation system is detected, and each of the operation systems, when receiving an operation request, operates as the substitute operation system for the sender network element of the operation request.

17. A backup method for an operation system in a communications system according to claim 14, wherein the representative network element respectively transmits a frame for selecting the substitute operation system to the other operation systems before sending the operation request,
each of the other operation systems, when receiving the frame, transmits a response frame to the frame to the representative network element, and
the representative network element receives the response frames respectively from the other operation systems, and selects the substitute operation system by use of information contained in these response frames.

18. A backup method for an operation system in a communications system according to claim 14, wherein each of the operation systems has a plurality of databases corresponding respectively to the plurality of operation systems, updates the database corresponding to the operation system itself by use of information obtained by operating at least one network element under the operation system itself, transfers difference information generated by the updating to the all other operation systems, if receiving the difference information from the other operation system, updates the database corresponding to the other operation system by use of the received difference information, further updates, if operating as a substitute operation system at least one network element under the failures-detected operation system, the database corresponding to the failures-detected operation system by use of the information obtained by operating the at least one network element, and transfers difference information generated by the updating to the all other operation systems or the other operation systems excluding the failures-detected operation system.

19. A backup method for an operation system in a communications system according to claim 17, wherein the plurality of network elements that the operation system is changed, while being operated by the substitute operation system, respectively monitor the failures-detected operation system, determine, when any one of the plurality of network elements detects a recovery of the failures-detected operation system, a second representative network element from the plurality of network elements, is amended to wherein the plurality of network elements where the operation system has changed, while being operated by the substitute operation system, respectively monitor the failures-detected operation system, determine, when any one of the plurality of network elements detects a recovery of the failures-detected operation system, a second representative network element from the plurality of network elements, wherein
the second representative network element selects, from the plurality of other operation systems, a restoration-assigned operation system assigned a process of restoring the plurality of databases included in the failures-detected operation system, and transmits a restoration request for restoring the databases of targets to the restoration-assigned operation system,
the restoration-assigned operation system, when receiving the restoration request, transfers contents accumulated in the plurality of databases included in the restoration-assigned operation system to the failures-detected operation system, and the failure-detected operation system, when receiving the accumulated contents from the restoration-assigned operation system, updates respectively the plurality of databases under itself by use of the accumulated contents.

20. A backup method for an operation system in a communications system according to claim 19, wherein the second representative network element, before transmitting the restoration request, transmits a frame for selecting the restoration-assigned operation system to the other operation systems, each of the other operation systems, when receiving the frame, respectively transmits a response frame corresponding to the frame to the second representative network element, and the second representative network element receives the response frames respectively from the other operation systems, and selects, as a restoration-assigned operation system, the other operation system detected as a sender of the response frame received first by the second representative communication system.

21. A backup method for an operation system in a communications system according to claim 19, wherein the second representative network element, before transmitting the restoration request, transmits a frame for selecting the restoration-assigned operation system to the other operation systems, each of the other operation systems, when receiving the frame, respectively transmits response frame corresponding to the frame to the second representative network element, and the second representative network element receives the response frames respectively from the other operation systems, and selects a restoration-assigned operation system by use of information contained in these response frames.

22. A backup method for an operation system in a communications system according to claim 19, wherein the second representative network element selects, as a restoration-assigned operation system, the operation system not selected as the substitute operation system, from the other operation systems.

23. A backup method for an operation system in a communications system according to claim 19, wherein the network element which is the first to detect the recovery of the operation system among the plurality of network elements monitoring the failures-detected operation system, becomes the second representative network element.

24. A backup method for an operation system in a communications system according to claim 14, wherein the network element, which is the first to detect the failures in an operation system among a plurality of network elements under this operation system, becomes the representative network element.

25. A backup method for an operation system in a communications system according to claim 14, wherein the plurality of network elements where the operation system has changed to the substitute operation system, monitor the failures-detected operation system and if any one of the plurality of network elements detects a recovery of the failures-detected operation system, the plurality of network elements get released from under the operation of the substitute operation system and return to under the operation of the recovered failures-detected operation system.

26. A backup method for an operation system in a communications system according to claim 14, wherein each of the network elements transmits a monitor frame to the operation system that operates the network element itself, monitors the operation system by receiving a response frame to this monitor frame from the operation system, and detects failures in the operation system only in a case where the response frame is not received before an elapse of a predetermined period since the monitor frame has been transmitted, and where a notification showing a completion of a preparation for sending the response frame has already been received from the operation system.

* * * * *